United States Patent [19]
Schoon

[11] Patent Number: 6,148,134
[45] Date of Patent: Nov. 14, 2000

[54] FIBER MOUNTS FOR FIBER OPTIC HARNESS IN A FIBER OPTIC-BASED IMAGING SYSTEM

[75] Inventor: David J. Schoon, Mendota Heights, Minn.

[73] Assignee: Schoonscan, Inc., Mendota Heights, Minn.

[21] Appl. No.: 09/276,007

[22] Filed: Mar. 25, 1999

[51] Int. Cl.⁷ .................................................. G02B 6/00
[52] U.S. Cl. ..................... 385/137; 385/115; 385/116; 385/134; 385/136
[58] Field of Search ................................. 385/115, 116, 385/134, 135, 136, 137, 147

[56] References Cited

U.S. PATENT DOCUMENTS

| | | | |
|---|---|---|---|
| 3,698,006 | 10/1972 | Ovshinsky | 346/74 P |
| 4,122,496 | 10/1978 | Childress et al. | 358/298 |
| 4,189,207 | 2/1980 | Fisher et al. | 385/116 X |
| 4,312,004 | 1/1982 | Samek et al. | 346/1.1 |
| 4,389,655 | 6/1983 | Baues | 346/107 R |
| 4,405,207 | 9/1983 | Kay | 385/116 X |
| 4,435,064 | 3/1984 | Tsukada et al. | 355/1 |
| 4,532,527 | 7/1985 | Behrens et al. | 346/108 |
| 4,542,392 | 9/1985 | Schulz-Hennig | 346/160 |
| 4,571,623 | 2/1986 | Schoon | 358/208 |
| 4,586,057 | 4/1986 | Schoon | 358/108 |
| 4,630,223 | 12/1986 | Schoon | 364/518 |
| 4,686,363 | 8/1987 | Schoon | 358/293 |
| 4,739,416 | 4/1988 | Manian | 358/302 |
| 4,746,942 | 5/1988 | Moulin | 354/5 |
| 4,761,057 | 8/1988 | Zak et al. | 356/310 |
| 4,867,530 | 9/1989 | Sedlmayr | 385/116 X |
| 4,929,048 | 5/1990 | Cuypers | 385/116 X |
| 4,975,729 | 12/1990 | Gordon | 355/1 |
| 5,009,475 | 4/1991 | Knudson | 385/116 X |
| 5,013,109 | 5/1991 | Zelan et al. | 362/32 |
| 5,054,893 | 10/1991 | Schoon | 359/254 |
| 5,109,460 | 4/1992 | Baek et al. | 385/115 |
| 5,121,459 | 6/1992 | Chiang | 385/120 |
| 5,225,851 | 7/1993 | Schoon | 346/108 |
| 5,274,397 | 12/1993 | Grover | 346/108 |
| 5,367,596 | 11/1994 | Chow | 385/116 |
| 5,434,600 | 7/1995 | Schoon | 347/243 |
| 5,550,946 | 8/1996 | Muehlemann et al. | 385/121 |
| 5,611,011 | 3/1997 | Morlion et al. | 385/59 |
| 5,684,620 | 11/1997 | Schoon | 359/298 |
| 5,812,720 | 9/1998 | Dannoux | 385/115 |

FOREIGN PATENT DOCUMENTS

| | | | |
|---|---|---|---|
| 0 112 518 A3 | 7/1984 | European Pat. Off. | 385/147 X |
| 0 192 486 A3 | 8/1986 | European Pat. Off. | 346/76 X |
| 0 264 341 A2 | 4/1988 | European Pat. Off. | 346/76 X |
| 0 506 410 A2 | 9/1992 | European Pat. Off. | 346/76 X |
| 0 529 532 A2 | 3/1993 | European Pat. Off. | 355/1 X |
| 36 43 214 A1 | 6/1988 | Germany | 385/115 X |
| 63-044626 | 2/1988 | Japan | 385/115 X |
| 63-189261 | 8/1988 | Japan | 385/115 X |
| 03058016 | 3/1991 | Japan | 385/115 X |
| 04085511 | 3/1992 | Japan | 385/115 X |
| WO 95/18423 | 7/1995 | WIPO | 355/1 X |
| WO 95/19606 | 7/1995 | WIPO | 355/1 X |

*Primary Examiner*—Brian Healy
*Attorney, Agent, or Firm*—Merchant & Gould P.C.

[57] ABSTRACT

A digital color printer uses different mounts for holding fibers that transport light from a distribution device to light modulators. One mount, for holding the optical fibers relative to a photosensitive surface, includes a body a body having a plurality of slots therethrough to receive the optical fibers. Each slot is provided with a funnel-shaped opening on an edge of the body. The slots are substantially parallel to each other and angled relative to the edge of the body. The slots have widths selected so that, when placed within the slots, the optical fibers form essentially linear arrays. Another mount, for grouping optical fibers to receive light from a light source, includes an element having a plurality of wells therethrough, each well connecting to an edge of the element by a respective channel section. Each channel section has a funnel-shaped section at the element edge. Each well has a shape selected so that input ends of fibers grouped in the well optimally couple light from the light source. A method of winding a fiber optic harness using the mounts is presented.

21 Claims, 17 Drawing Sheets

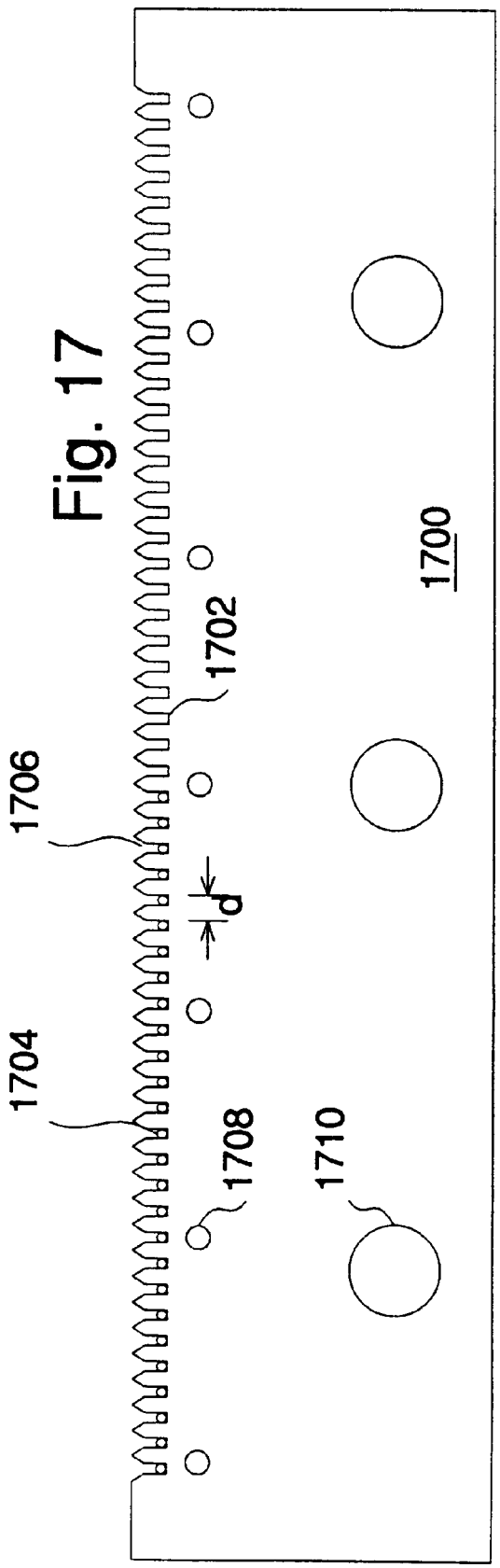

FIBER MOUNTS FOR FIBER OPTIC HARNESS IN A FIBER OPTIC-BASED IMAGING SYSTEM

INCORPORATION BY REFERENCE

U.S. Pat. No. 5,684,620 (Schoon, "High Resolution Imaging System And Method Of Imaging Using The Same") is fully incorporated herein by reference. Co-pending and co-assigned U.S. patent application Ser. No. 09/276,433, pending, entitled "Light Distribution Device For Fiber Optic-Based Imaging System," filed by the current inventor on Mar. 25, 1999, is also incorporated herein by reference.

BACKGROUND

The invention is directed to digital color printers, and methods of forming images on photosensitive media and the like. More particularly, the invention is directed to a system and method of forming multiple pixel images simultaneously via many concurrently operating beams of light.

Digital color printers, also known as imaging systems, form visually observable images on hard copy from electronic information. Examples include xerographic printers, ink jet printers, laser, LED and CRT imagers (including black and white or color, and imaging onto silver halide media), dye sublimation and wax transfer imagers, among others. With each type of system there is generally a computer file of electronic information which contains representations of photographic images, artwork, graphics and/or text, and there is a desire to obtain a paper or film hard copy from that data.

Electronic production and manipulation of images and text is highly efficient. It is becoming increasingly more common to store photographs as computer files rather than, or in addition to, pieces of film. The digital environment permits easy retouching and editing, addition of text and imposition of various photos into a layout. Moreover, in the case of color photographs, digital color lookup tables can compensate for deficiencies in the photographic media and in the exposure conditions. The existence of images in digital form creates a need for high quality imaging systems to create hard copies of these digital images.

Some imaging technologies require the use of light for the creation of a latent image on a xerographic drum or on silver halide media. One common way of doing this is to deflect a laser beam with a rotating polygon mirror. For exposure of color silver halide media, for example, three lasers are used, one each of (typically) red, green, and blue.

A commonly sought objective is to obtain high imaging speed, for example more than two square feet per minute; high resolution, for example more than 400 continuous tone pixels/inch (more than about 160 pixels/cm); and large image size, for example images from rolls of paper of 20" (approx. 50 cm) or greater width. It is also desired to minimize the size of the equipment used to produce this image. However, speed, resolution, image size, and equipment size tend to be competing factors that must be balanced or compromised.

One particular application for imaging technologies is in point of sale advertisements or trade show displays, many of which may need to be as large as 50"×100" (approximately 125 cm×250 cm) or larger. In such cases, it is desired that the text be sharp, even at close viewing distances. It is also desired that the image be created in a short time, for example less than 10 minutes. These simultaneous objectives cannot be met or approached by conventional technologies.

Another application is the "package printer" market which requires that photos, such as school portraits, be imaged at various sizes and with the addition of text and other graphics. To compete with other processes the imaging speed must be at least 0.25 lineal inch per second (approximately 0.6 cm per second), and text even as small as 4 point size must be clearly readable. Again, this is not currently possible with conventional technologies.

Another application is the pre-press market, wherein proofs of information are desired in advance of the direct imaging of printing plates. The proofs should show true colors, should show the halftone dots, and they should be imaged quickly, in a few minutes or less. This is not possible with conventional technologies.

Many other applications exist for a digital color printer. Digital cameras are becoming available which bypass the use of film, but allow no alternative but that the hard copy be produced by a digital rather than film-based device.

Therefore, a substantial need has arisen for an imaging system offering high speed, high quality color, high resolution, large image size, small equipment size, and moderate equipment cost. This is not possible with ink jet technology, 3-laser technology, CRT technology, xerographic technologies, LED technology, or other known conventional technologies.

SUMMARY OF THE INVENTION

Generally, the present invention relates to color digital printers, particularly to devices for forming fiber harnesses by holding a number of optical fibers in particular positions.

In one embodiment, a mount for holding optical fibers relative to a photosensitive surface, includes a body a body having a plurality of slots therethrough to receive the optical fibers. Each slot is provided with a funnel-shaped opening on an edge of the body. The slots are substantially parallel to each other and angled relative to the edge of the body. The slots have widths selected so that, when placed within the slots, the optical fibers form essentially linear arrays.

In another embodiment, a mount for grouping optical fibers to receive light from a light source includes an element having a plurality of wells therethrough, each well connecting to an edge of the element by a respective channel section. Each channel section has a funnel-shaped section at the element edge. Each well has a shape selected so that input ends of fibers grouped in the well optimally couple light from the light source.

Another embodiment is a method of forming a pixel fiber optic harness. The method includes arranging at least one pair of fiber mounts on a rotor, the pair of fiber mounts including a pixel fiber input end mount and a pixel fiber output end mount and rotating the rotor while feeding an optical fiber into selected openings on the pixel fiber input and output end mounts. The method further includes affixing the optical fiber to the pixel fiber input and output end mounts, cutting the optical fiber between selected adjacent pixel fiber input and output end mounts to form a plurality of pixel fibers with input and output ends, and polishing the input and output ends of the pixel fibers flush with their respective pixel fiber input and output end mounts.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 17 illustrates a mount for distribution fibers according to an embodiment of the present invention.

Figure 1:
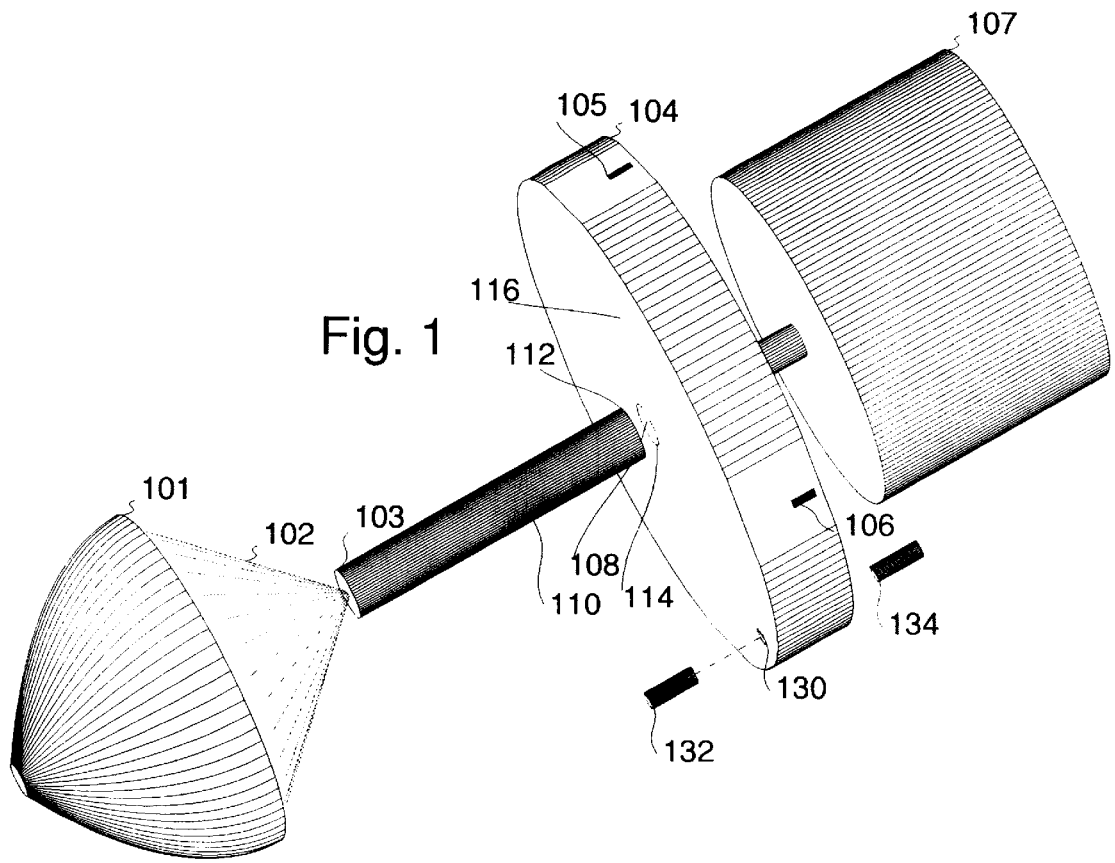
FIG. 1 shows an embodiment of a light distribution device according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

A digital color printer described in U.S. Pat. No. 5,684,620, incorporated herein by reference, shows one particular approach to accomplishing the characteristics of speed, color quality, resolution, image size, small equipment size and reasonable cost that are required of digital color printers. In general, the printer provides for simultaneous imaging of multiple pixels. Imaging is accomplished in modules, each module containing one array of solid state (for example a PLZT or Kerr Cell type) light valves, these light valves being on a single chip. The light produced by the array of light valves is imaged by a lens onto photographic paper or other light-sensitive media. A similar image is created by other, adjacent modules, and the modules are aligned to create a continuous band of image over the entire width of the photographic paper.

Figure 7:
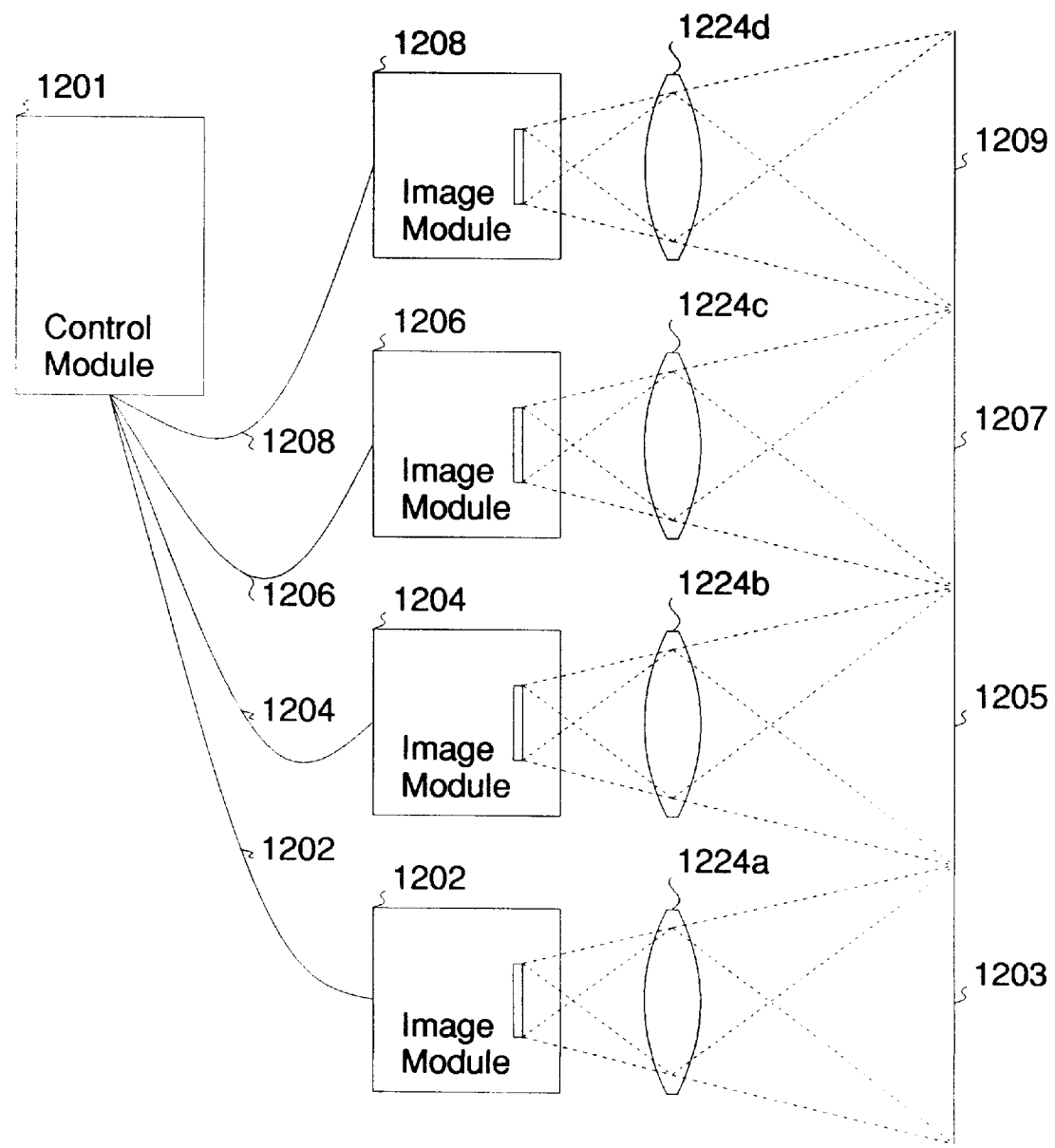
FIG. 7 shows a color digital printer in block schematic form.

The printer 1200 is illustrated in schematic form in FIG. 7. The printer includes a control module, 1201, which includes a light source, and a mechanism for distributing light from the light source sequentially into stationary fiber bundles. Bundles of fibers are illustrated as conduits 1220, 1221, 1222, and 1223. Each imaging module 1202, 1204, 1206, and 1208, includes a light valve chip coupled to respective conduits 1220, 1221, 1222, and 1223, and includes an associated projection lens system 1224a–1224d. The projection lens system may include one or more separate lenses. Each module 1202, 1204, 1206, and 1208, projects an image onto the photographic paper in respective imaging regions 1203, 1205, 1207, and 1209. The imaging regions 1203, 1205, 1207, and 1209 at least abut each other, and may be aligned to slightly overlap. Only four imaging modules are shown, but any number may be used in a particular application.

Figure 8:
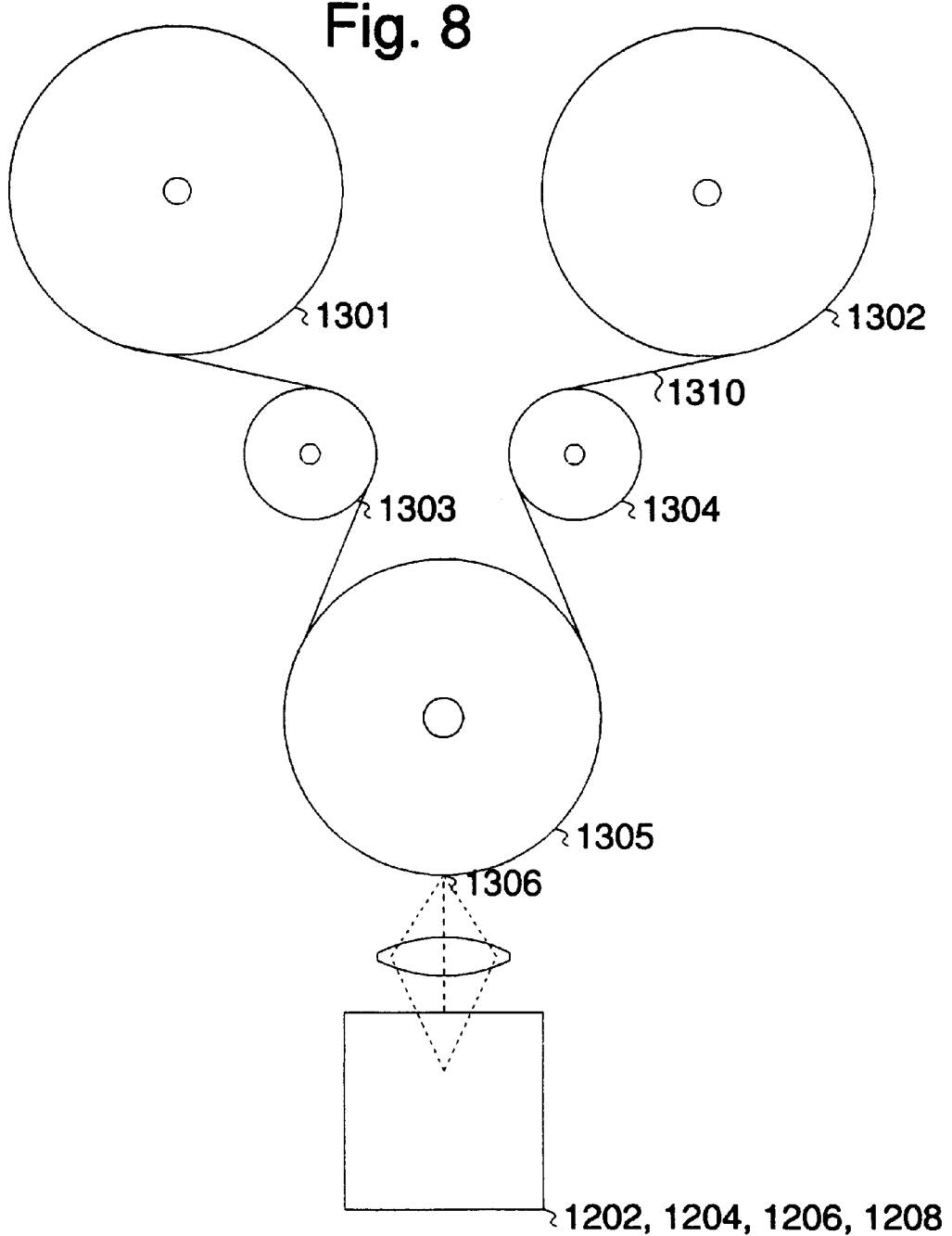
FIG. 8 illustrates a paper path through a color digital printer.

The optical arrangement of imaging modules and photosensitive paper may be better understood by looking at the paper path, illustrated in FIG. 8. Photosensitive paper 1310 is typically provided in lengths of 275 or 575 feet (approximately 84 m or 175 m) on a supply roll, 1301. A dancer roller, 1303, applies tension to the paper 1310 and is free to move from side to side to maintain constant paper tension. A slowly rotating capstan, 1305, controls the slow movement of the paper, typically at about 0.30"/second (approximately 0.76 cm/s) during imaging. Another dancer roller, 1304, also acts to maintain constant tension on the paper 1310. The paper 1310 is taken up by the take-up roll, 1302. The imaging modules 1202, 1204, 1206, and 1208 project a continuous line of image across the sheet of paper 1310 at the imaging region 1306.

Figure 9:
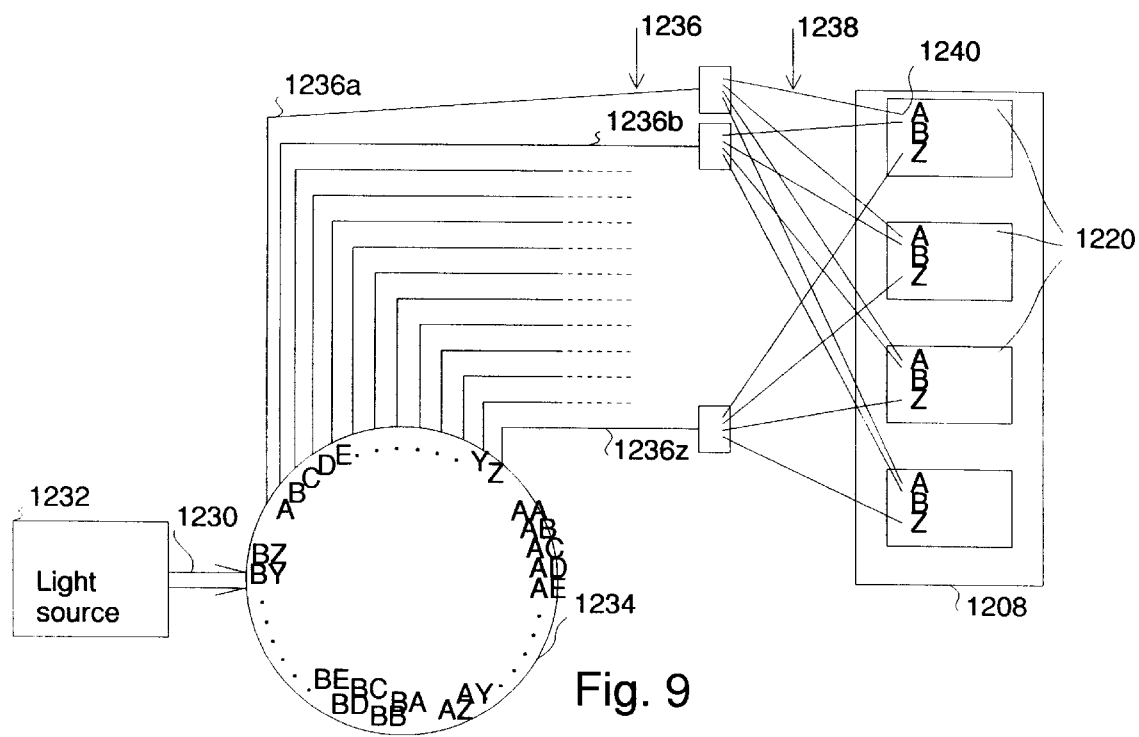
FIG. 9 schematically illustrates one embodiment of a light distribution device coupled through optical fibers to light valve devices.

The distribution of light from the light source to the imaging modules 1208 is described with reference to FIG. 9, which shows a simplified arrangement with only a single imaging module 1208. The imaging module 1208 includes a number of light valve cells 1220 for controlling the amount of light passing to the photosensitive paper 1310. Light 1230 is directed from the light source 1232 to a light distribution device 1234 that distributes the light sequentially to a number of distribution fibers 1236a–1236z. Each distribution fiber 1236a–1236z is coupled to a group of N pixel fibers 1238, where N is the number of light valve cells 1220 in the imaging module 1208. Each pixel fiber 1238 within in one group is coupled to a different one of the N light valve cells 1220, therefore, there is a different light valve cell 1220 associated with each pixel fiber 1238. The output ends 1240 of the pixel fibers 1238, at the opposite ends from the coupling to the distribution fibers 1236, are coupled to respective light valve cells 1220. The output ends 1240 may be arranged in a specific order, for example the output ends 1240 of the pixel fibers 1238 leading from the first distribution fiber 1236a are positioned first on the light valve cell 1220, followed by the output ends 1240 of the pixel fibers 1238 leading from the second distribution fiber 1236b, and so on. The last output end 1240 positioned on the light valve cell 1220 leads from the last distribution fiber 1236z. Typically, there are M distribution fibers 1236 coupled to the distribution device 1234, each coupled to direct light to M different positions of the light valve cells 1220, where each position of the light valve cell 1220 corresponds to a printed pixel.

The distribution of light operates in the following manner. The light source 1232 transmits light to the distribution device 1234. At the point in time when the distribution device 1234 distributes light into the first distribution fiber 1236*a*, all the first positions, marked A, on the light valve cells 1220 are illuminated. At this time, each of the light valve cells 1220 is controlled to pass or block light for the pixels on the photosensitive paper corresponding to the first positions A of the light valve cells 1220. A short time later, the distribution device 1234 distributes light to the second distribution fiber 1236*b*, and so the positions B on each of the light valve cells 1220 are illuminated. At this time, each light valve cell 1220 is controlled to pass or block light for the pixels corresponding to the second positions B of the light valve cells 1220. This process is repeated up to the time when the distribution device 1234 distributes light to the last distribution fiber 1236*z*, at which time the last positions Z on each light valve cell 1220 is illuminated. At this time, each light valve cell 1220 is controlled to pass or block light for the pixels corresponding to the last positions Z of the light valve cells 1220. The structure of the light valve cells 1220 is described hereinbelow.

After the distribution device 1234 has distributed light to the last position Z, it may return to distributing light at position A to the first distribution fiber 1236*a*, or it may continue to distribute light at other positions, for example at positions AA through AZ, and BA through BZ, to other distribution fibers associated with other imaging modules. The distribution device 1234 may be configured to distribute light to more than one distribution fiber 1236 at any one time. For example, it may be configured to simultaneously distribute light to three different distribution fibers at positions A, AA, and BA, respectively, followed by B, AB, BB, and so on until it reaches positions Z, AZ, and BZ.

Furthermore, there may be more than one distribution fiber located at each position of the distribution device 1234. For example, there may be two or more distribution fibers located at each of positions A–Z of the distribution device 1234, where the first set of distribution fibers 1236 feeds light to a first imaging module and a second set of distribution fibers feeds light to a second imaging module operating in parallel and simultaneously with the first imaging module.

It should be appreciated that the input ends of the pixel fibers 1238 may be bundled and positioned around the distribution device 1234 directly, without the need for the distribution fibers 1236. This avoids the optical losses encountered at the coupling between the distribution fibers 1236 and the pixel fibers 1238. On the other hand, this approach requires the placement of a large number of pixel fibers 1238 around the distribution device 1234. The pixel fibers 1238 are typically significantly smaller in diameter than the distribution fiber, and are typically fragile and easily broken. Therefore, it is convenient to protect the pixel fibers by mounting them in modules, and coupling them to the distribution device 1234 by the distribution fibers 1236. Furthermore, in large systems, where there is a large number of pixel fibers 1238 and/or the paper to be exposed is wide, manufacturing complexity, weight and cost may all be reduced by using distribution fibers 1236 to distribute light from the distribution device to a point physically close to the imaging modules.

Each light valve cell 1220 is illuminated by multiple pixel fibers. An imaging module 1208 includes a number of light valve cells 1220 on one or more light valve chips. Several imaging modules 1208 operate in parallel to ensure that the entire width of photographic media is exposed by a more or less continuous band of light. As discussed above, the timing of the control data fed to each light valve cell is made to correspond with the particular fiber or fibers being illuminated at each instant in time. The color of light presented to the light valve cells 1220 changes in sequence, for example from red to green to blue and back to red, in order to print in color.

Each light valve cell 1220 generates not just one but many pixels across the paper. For example, if each light valve cell 1220 is coupled with 32 pixel fibers, then each light valve generates 32 pixels. The number of light valves is selected to be small enough so that the requirements of the electronic control circuitry are reasonable, yet the number of light valves is high enough so that the speed of imaging is high. The selection of the number of imaging modules and pixels associated with each light valve cell 1220 generally represents a compromise between system complexity and printing speed.

While some imaging modules are imaging with red light, other modules may be imaging with green light or with blue light. Moreover, some pixel fibers create images at points further ahead in the direction of paper motion while other pixel fibers create images at points further behind in that same direction. This is due to the fact that the lines of fibers are not arranged perpendicular to the direction of paper motion, but are arranged at an angle relative to the motion direction. This angular arrangement results in the use of more fibers to cover the width of the paper, resulting in a higher resolution without requiring optical fibers of smaller diameter, which are harder to work with and more susceptible to breakage. The electronic data used to control the light valve chips is programmed to reflect the timing, position, and color of illumination of various pixels.

Figure 10:
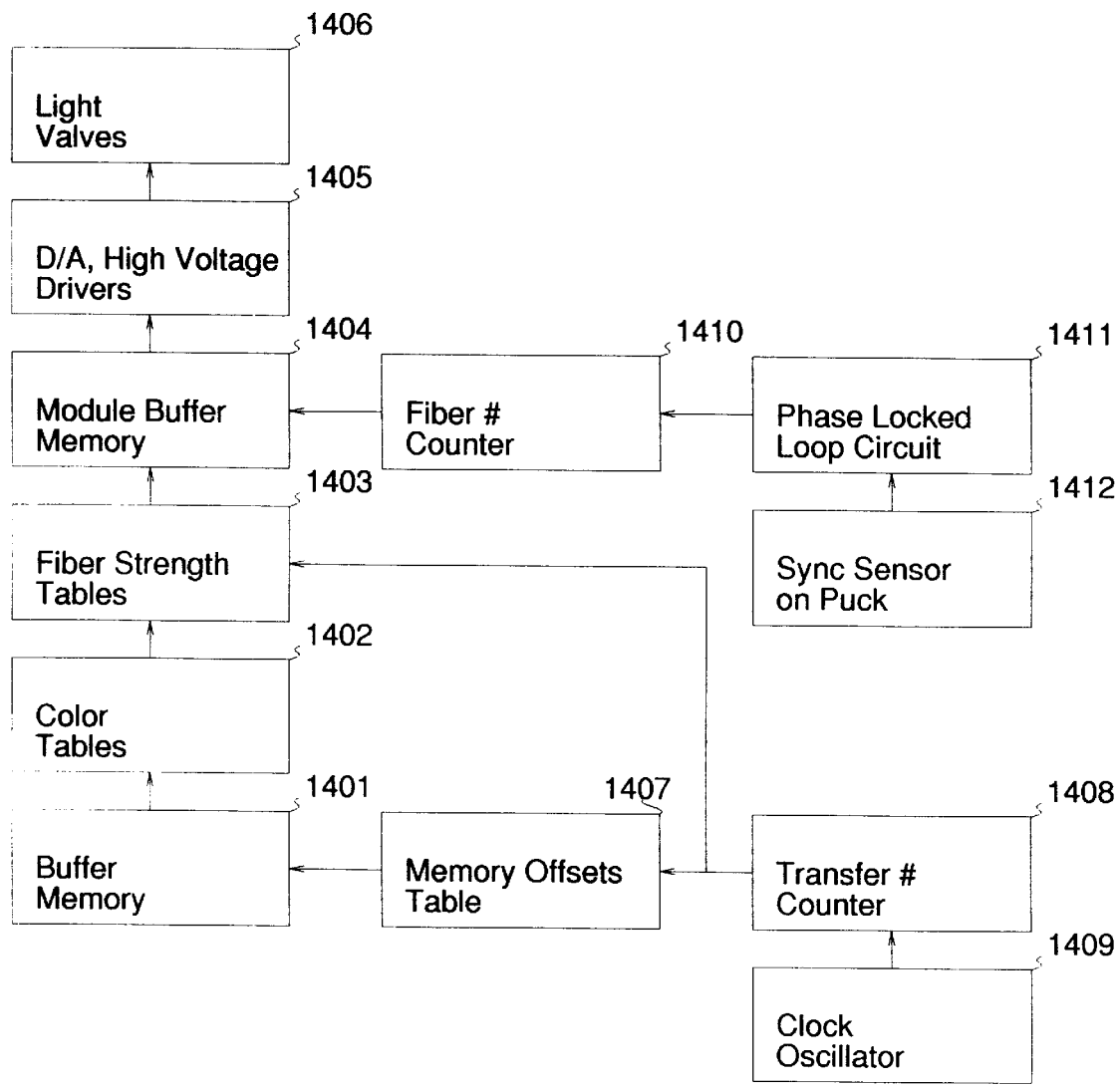
FIG. 10 schematically illustrates one embodiment of control electronics to control operation of the light valves.

A simplified functional block diagram showing the organization of the electronic control system is given in FIG. 10. A clock oscillator, 1409, provides clock pulses which are counted by the transfer number counter, 1408. The counter 1408 counts, for each pixel line (once for each revolution of the light distribution device described below) one count for each of the pixel fibers in the imager. The fiber number count, provided by the counter 1408, serves as an address input to the memory offsets table 1407. This table 1407, which may be implemented as a memory, provides a read address offset for the buffer memory 1401. Memory 1401 may be large, for example, 400 megabytes in size, and contains the file to be imaged on to the paper. The address offsets provided by table 1407 include compensation for the angle of each line of fibers relative to the direction of paper motion. Compensation for slight overlaps between cells and between modules may also be provided. Moreover, the address offsets provided by table 1407 may also account for any mechanical mismatch between modules.

The output of buffer memory 1401 flows into the color table memory 1402 which provides color compensation for the characteristics of the color media, and also compensates for any nonlinearities of the light valves. Such compensation typically includes general compensation, without providing compensation for individual light valves. The data output from the color table memory 1402 then flows into fiber strength memory 1403. The fiber strength memory 1403 also receives as an address input the transfer number address from the counter 1408. The fiber strength memory 1403 provides compensation on a fiber-by-fiber basis. The compensation covers, for example, intensity variations caused by variations in fiber-to-fiber horizontal spacing that may be caused primarily by pixel fibers not being arranged exactly in a straight line with respect to their respective light valve cells, overlap between the end pixel fiber(s) in one line with the first pixel fiber(s) in the next line (or cell), and variations in the polishing of the pixel fibers. The fiber strength memory 1403 ensures that at every fiber causes the same degree of exposure of the photographic paper as every other fiber. The image data passes out from the fiber strength memory 1403 into each of the module buffer memories 1404. Each imaging module 1202, 1204, 1206 and 1208 has its own module buffer memory 1404. Within each imaging module, the data flows from the buffer memory 1404 into a digital-to-analog (d/a) converter and high voltage driver circuit 1405 which supplies the various voltages needed by the light valves, 1406.

The module buffer memory 1404 typically receives data from the fiber strength memory 1403 in serial form, i.e. one pixel at a time. Changes in data transmitted to the light valves 1406 need to occur at specific points in time, and in a massively parallel format. The module buffer memory 1406 therefore stores the serially received data from the fiber strength tables 1403 to permit the data to be transmitted to the light valves 1406 at the correct time and in parallel. The module buffer memory 1406 receives data in a 24-bit bus, 8 bits for red, 8 for green, and 8 for blue, and delivers that data to the d/a converters and high voltage drivers, 1405, 8 bits at a time, selected for the color being imaged. The color and fiber # to be selected for delivery of data to the d/a converters and voltage drivers 1405 is determined by the fiber number counter, 1410, which determines not only the distribution fiber number (for example 1 to 54) being imaged by any module at any instant, but also determines the color of imaging. The fiber number counter 1410 may be a lookup table memory, and receives an address input from a phase locked loop (PLL) circuit 1411. The PLL circuit 1411 synchronizes to the synchronization sensor 1412 on the light distribution device. The synchronization sensor 1412 provides a sync pulse for every sync cycle of the light distribution device 1234. The PLL circuit 1411 divides that time interval into as many equal time intervals as are necessary to complete one fall revolution of the light distribution device 1234. For the example discussed below with respect to Table I, this is 248 equal time intervals.

One particular embodiment of a digital color printer is suitable for exposing standard RA 4 processable color paper (e.g., Kodak Supra II or Konica QA) for making color prints from digital information. Such a printer may image paper having a width of 30" (approximately 76 cm), at 512 pixels/inch (approximately 200 pixels/cm), with a lineal speed of 0.3"/second (approximately 0.76 cm/second). This embodiment uses eighteen imaging modules, each imaging module imaging approximately one eighteenth of the paper width. Each imaging module includes sixteen light valve cells with fifty four pixel fibers positioned in a linear array behind each light valve cell. Thus, each imaging module generates 16×54=864 pixels. Each of the fifty four pixel fibers is sequentially illuminated in typical successive cycles of red, green, and blue light.

In order to increase the imaging capability of each light valve cell, each light valve is not illuminated uniformly or completely, but selectively by, at any instant in time, one or a small number of the pixel fibers located behind each cell. Each light valve cell is made, at any instant in time, optically opaque or transparent, or partly opaque, according to the magnitude of voltage applied to the light valve cell by the high voltage drivers 1405.

The total number of pixel fibers in the imager is 864× 18=15,552. The diameter of the pixel fibers is determined by the required resolution and printing speed, and also by considerations of manufacturability. Where the pixel fibers are 0.003" (approximately 75 μm) in diameter, they are fragile and easily subject to damage. Therefore, in order to minimize the likelihood of fiber breakage during manufacturing and servicing of the imager, light is distributed within the imager first by illuminating, at the distribution device 1234, relatively large distribution fibers, typically having a diameter of approximately 0.02", or 500 μm. The light may then be transported from the distribution device 1234 to each imaging module by an associated group of distribution fibers. Each 0.02" diameter distribution fiber illuminates the input ends of sixteen 0.003" (75 μm) diameter pixel fibers.

The repeating sequence of illumination of the fifty four distribution fibers which are presented to each imaging module are as shown in Table I. Each cycle number takes 26.25 microseconds to complete, and the overall cycle repeats indefinitely.

TABLE I

Illumination Sequence for Distribution Fibers

| Cycle # | Color | Distribution Fiber |
|---|---|---|
| 1 | red | #1 |
| 2 | red | #2 |
| 3 | red | #3 |
| ... | | |
| 54 | red | #54 |
| 55–62 | none | — |
| 63 | green | #1 |
| 64 | green | #2 |
| 65 | green | #3 |
| ... | | |
| 116 | green | #54 |
| 117–124 | none | — |
| 125 | blue | #1 |
| 126 | blue | #2 |
| 127 | blue | #3 |
| ... | | |
| 178 | blue | #54 |
| 179–186 | none | — |
| 187 | red | #1 |
| 188 | red | #2 |
| 189 | red | #3 |
| ... | | |
| 240 | red | #54 |
| 241–248 | none | — |
| 1 | red | #1 |
| etc. | | |

The complete cycle repeats every (248×26.25=)6510 microseconds. Therefore, there are 153.6 cycles per second. The vertical resolution on the photosensitive paper may be the same as the horizontal resolution, namely 512 pixels/inch (200 pixels/cm), so the vertical rate of imaging is 153.6/512,=0.30" per second (0.76 cm/s). It should be appreciated that the vertical resolution on the photosensitive paper may be different from the horizontal resolution.

Two red exposures may be used for every single exposure of green or blue where the photosensitive paper, for example RA4 processable color negative paper, is less sensitive to red than to green or blue. The double exposure to red, together with some variation in the dwell time of the light distribution device 1234, compensates for this characteristic of the paper. It should be understood that "fiber #1" referred to above means all fibers #1 in each of many, e.g., 16, light valves per module and each of 18 modules, 288 fibers in all, are illuminated.

It is important that, of the many pixel fibers in each array gated by a single light valve, only one or two of the pixel fibers should be brightly illuminated while the others receive little, if any, light. This assures that there is no crosstalk among the different pixels of the image. Moreover, after all of the fibers associated with one imaging module have been successively illuminated with one color, the color is changed to be successively red, green, and blue.

The method of distributing light from the light source sequentially to multiple fibers that was disclosed in U.S. Pat. No. 5,684,620 involved a rotating polygon mirror. In order to project a small spot onto the fibers, a highly collimated and well focused beam of light was needed, which required the use of a short-arc xenon lamp. Short-arc xenon lamps are difficult to operate due to the substantial electromagnetic interference (EMI) generated during starting, and the complicated driving circuit that is required. Moreover, synchronizing a color filter wheel to the rotating polygon mirror is complex.

Another concern is contrast ratio. In normal operation, each fiber is "off", i.e. is not illuminated, for a period of time substantially longer than it is "on", i.e. is illuminated. Therefore, any light scattered to the "off" fibers is integrated by the light-sensitive media for a relatively long time. A realistic requirement for contrast ratio of light presented to the fibers is of the order of $1.6 \times 10^4$, which is difficult to achieve with light distribution based on a rotating mirror.

Figure 2:
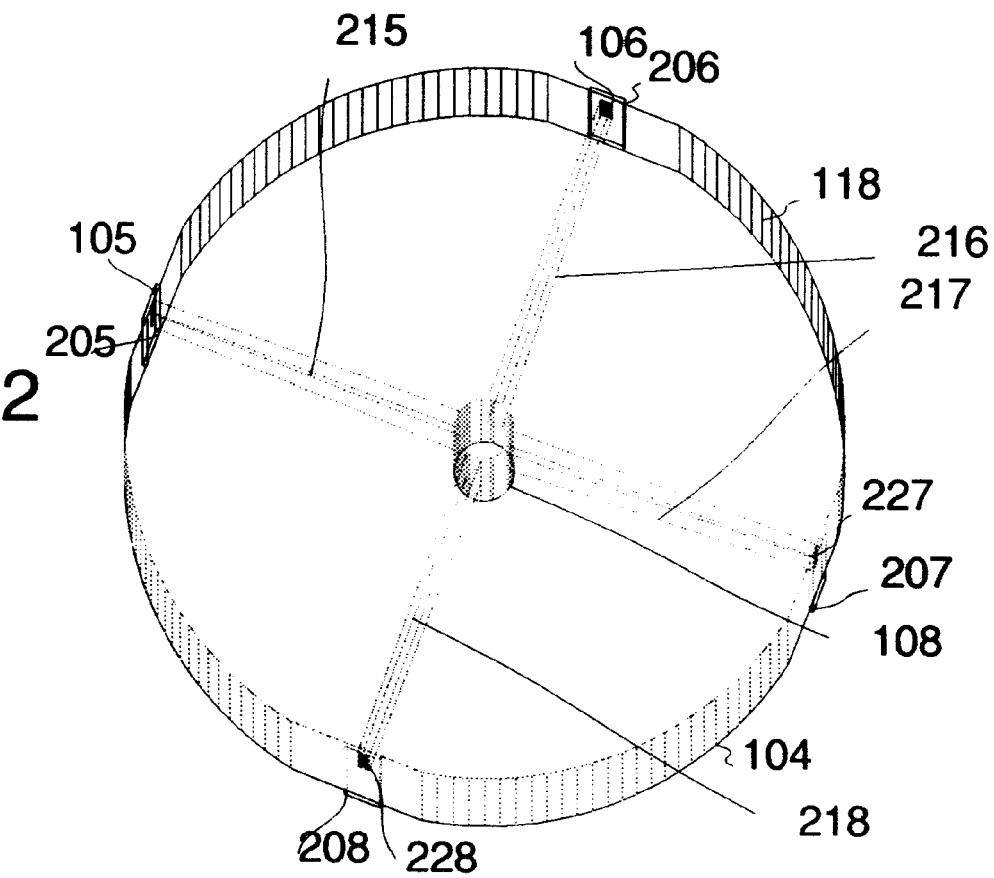
FIG. 2 shows a detailed view of the light distribution device of FIG. 1.

According to one particular embodiment of the invention, and with reference to FIGS. 1 and 2, white light is generated by a lamp 101, for example a type ELC quartz halogen projector lamp, which contains an integral reflector (the figure shows the external surface of the reflector). The white light is projected via optical paths 102 to focus on one end 103 of a light guide such as a fiber optic bundle 110. One example of a fiber optic bundle 110 includes a plurality of individual fibers, each having a diameter of 0.002" (approximately 50 µm), where the diameter of the bundle input end 103 is 0.313" (approximately 0.8 cm). The output end 112 of the fiber optic bundle 110 is positioned close to the center of a rotating body 104, driven by a motor 107 to rotate about its axis at the speed which is needed to accomplish the fiber "on" times indicated above. Using the above example, this speed is 153.6 revolutions/second, or 9,216 RPM. The rotating body 104 may be, for example, disk-shaped. This shape is referred to hereafter as a "puck," but it should be noted that other shapes may be used. It will also be appreciated that light may be focused on to the input face 116 directly, without the use of the fiber optic bundle 110.

A light guide 114 within the puck 104 has an input face 116 located at the center 108 of the face of the puck 104 opposing the bundle 110. The input face 116 receives the light from the bundle 110. The light guide 114 separates the incoming light along a number of different paths to output ports located on the outer perimeter 118 of the puck 104. In the particular embodiment illustrated, the light guide 114 separates the light along four different paths to output ports, of which two 105 and 106 may be seen in FIG. 1. The light guide 114 may also be formed from a plurality of fiber optic strands, starting at the center 108 of the puck face, and approximately one quarter of the strands are directed to each of the four output ports arranged around the perimeter 118. Each output port may advantageously include a rectangular arrangement of fibers. In other embodiments, the light guide 114 may be coupled to any suitable number of output ports, not just four. For example, the light guide may be coupled to one, or more, output ports.

Internal fiber optic pathways 215, 216, 217, and 218 lead from the center 108 of the puck 104 to the output ports 105, 106, 227, and 228. Each port is covered by a respective dichroic color filter 205, 206; 207 and 208. Here, filters 205 and 208 transmit red light, filter 207 transmits blue light and filter 206 transmits green light. The colors of the filters may be selected to optimize the exposure of the photosensitive medium, and need not necessarily be red, green or blue.

Slightly more than one quarter of the fibers in the light guide 114 are used for each of the two red filtered ports 105 and 228, and slightly less than one quarter of the fibers are used for each of the green and blue filtered ports 106 and 227. The number of fibers directed to each port is selected in accordance with the spectral sensitivity of the photosensitive paper upon which an image is to be printed. The widths of the ports 105, 106, 227, and 228 (in the direction of the puck's circumference) are selected to correspond to the number of fibers which exit at each slit, which may be approximately 0.070" (around 0.175 cm). The height of each port 105, 106, 227, and 228 (in the direction parallel to the puck's rotation axis) may be approximately 0.150" (0.38 cm). It will, of course, be appreciated that the ports may have non-rectangular shapes and have dimensions different from those described here for this particular example. It should also be appreciated that the variation in exposure between ports may be accomplished additionally or alternatively by variously sized apertures placed over the dichroic filters.

Where the widths of the ports 105, 106, 227, and 228 are significantly less than 0.070", for example 0.035" wide, mostly only one distribution fiber is illuminated at any one time, having the effect of providing sharper images. A disadvantage of this approach is, however, is that there is a lower overall light efficiency, thus necessitating that the optical source is brighter in order to obtain the same imaging speed.

Figure 3:
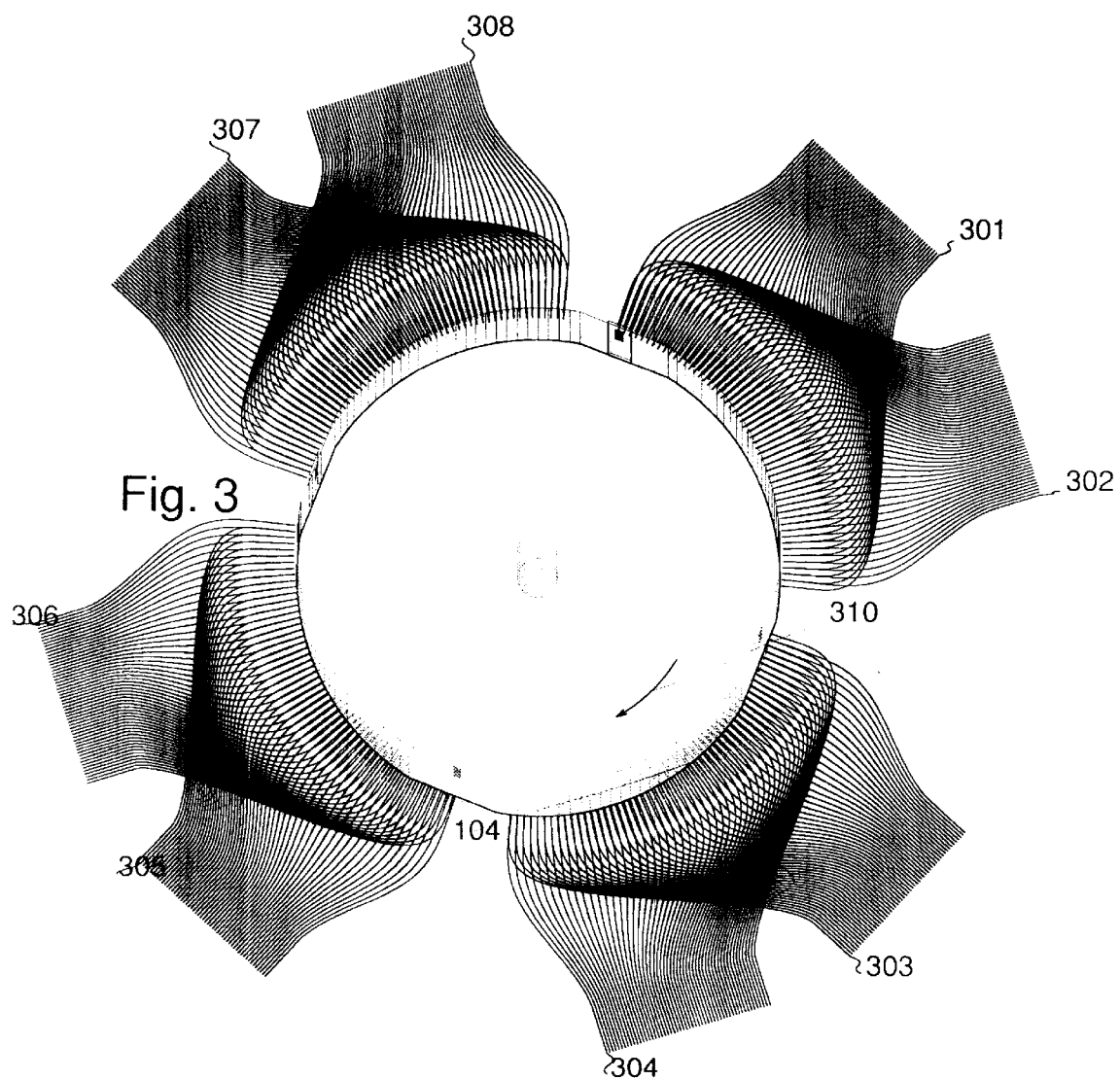
FIG. 3 shows an arrangement of stationary fibers surrounding the light distribution device.

One particular arrangement of distribution fibers positioned around the puck 104 to receive light from the exit ports of the puck 104 is illustrated in FIG. 3. Various groups of distribution fibers, each including a specific number of large diameter fiber optics, are placed around the puck 104, the fibers being spaced at regular angular intervals so as to receive bursts of light as the puck 104 rotates around its axis. The distribution fibers may be mounted in a stationary block, or stator, (not illustrated) that contains slits to hold the fibers in position. Where there are fifty four distribution fibers for each imaging module, with 248 cycles, as described in the example above, the distribution fibers may be positioned around the puck 104 at regular spacings of 1.45° (1/248 of a circle).

In one particular embodiment, the distribution fibers have a diameter of 0.02" (approximately 0.05 cm), the puck 104 has a diameter of 3" (7.5 cm) and the spacing between distribution fibers close to the spinning puck 104 is approximately 0.038" (approximately 0.096 cm). The slits in the stator that hold the fibers are 0.020" (approximately 0.05 cm) wide and 0.120" (approximately 0.3 cm) long. For clarity, only two distribution fibers are illustrated for each slit position, for example distribution fibers from the groups marked 307 and 308. Each of the ports 105, 106, 227, and 228 on the puck 104 projects light onto the large diameter fibers. If the ports 105, 106, 227, and 228 are narrow, and the spacing between the puck circumference 118 and the surrounding stationary fiber bundles is small, approximately only two distribution fiber positions are illuminated by each port 105, 106, 227, and 228 at each instant in time. When the distribution fibers are not receiving light, they "see" the surface of the perimeter 118, which is advantageously black to reduce scattered light and, therefore, provide a high contrast between light levels when the fibers are "on" and "off".

The eight groups of distribution fibers 301, 302, 303, 304, 305, 306, 307, and 308 illustrated in FIG. 3 support eight imaging modules. The arrow 310 shows the direction of puck rotation. To support, as is desired, not eight but rather a total of eighteen imaging modules, a greater number of distribution fibers need to be placed at each position around the puck 104. For example, four distribution fibers may be located at each position for two groups of positions and five distribution fibers located per position for the remaining two groups of positions.

The circuitry used to control the light valve cells needs to "know" where the puck 104 is at each point in time. One method of deducing the instantaneous position of the puck 104 is to project light through a small hole 130 in the puck. A light source 132, such as a light emitting diode or a laser diode, is placed on one side of the puck 104 and a light detector 134, such a photodiode or phototransistor, is placed on the other side of the puck 104. The light detector 134 detects a light signal when the hole 130 is aligned between the light source 132 and the detector 134, i.e. once every revolution of the puck 104. This generates a "start of scan" pulse. It will be appreciated that electronic circuitry may be used to time the interval between the "start of scan" pulses and to divide this interval time into a number of equal time units, 248 time units in the current example. At the start of each such interval in time (each being 26.25 microseconds long), new data is used to control each of the various light valves according to which particular fibers are being illuminated at that time.

Figure 4:
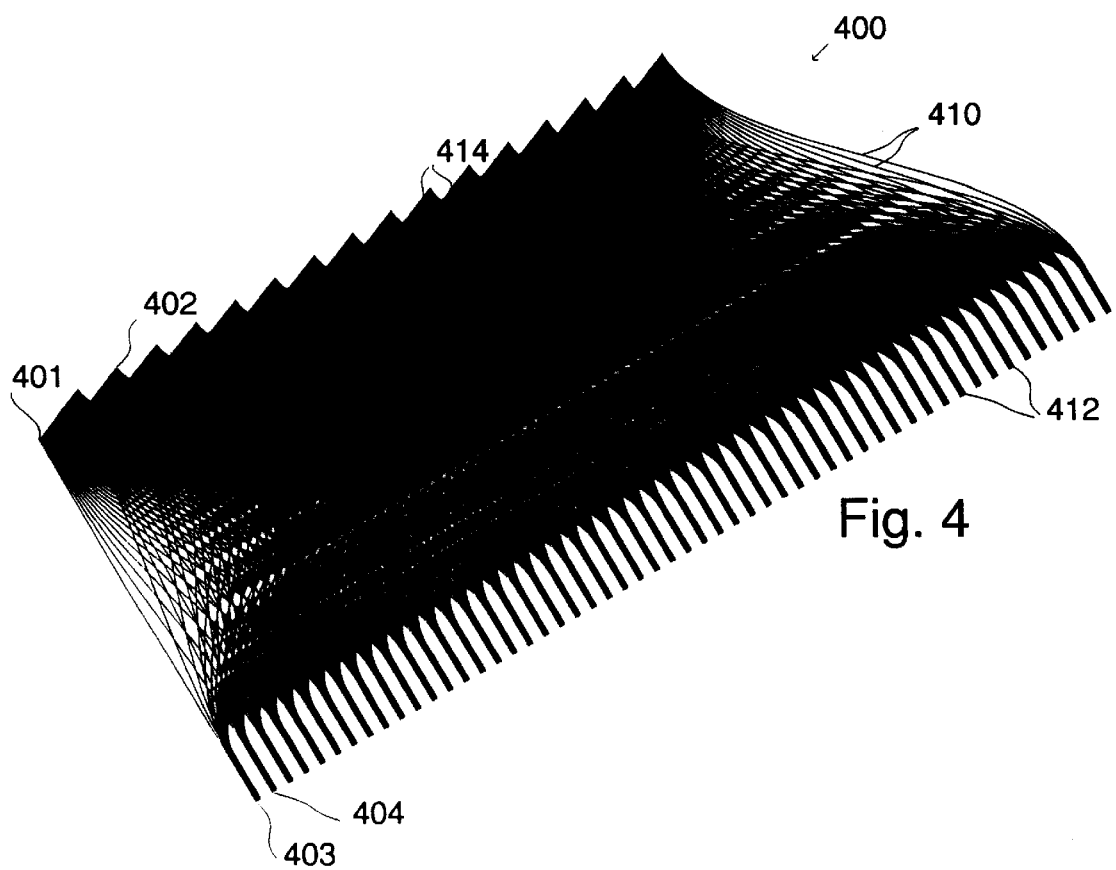
FIG. 4 illustrates locations of optical fibers in an interface between stationary fibers surrounding the light distribution device and individual light valves.

Within each imaging module is a light valve chip containing a number of light valve cells. In this particular embodiment, the light valve cells take the form of a narrow slit. Behind each of these slit-shaped light valve cells is situated a linear row of pixel fibers. A harness 400 of pixel fibers 410 for a single imaging module 1208 having sixteen light valve cells, where each light valve cell prints fifty four pixels, is illustrated in FIG. 4. The pixel fibers 410 may be, for example, 75 micron (0.003") diameter, fused silica fiber optic strands, as manufactured by Polymicro Technologies, Inc., type FDP-061-067-075 A. Each pixel fiber 410 has an input end 412 and an output end 414. The output ends 414 are in linear groups 401 and 402 positioned behind the light valve cells. The input ends 412 are in bundles 403 and 404 positioned to receive light from the distribution fibers 1236 leading from the distribution device 1234. In the present example, each imaging module has a group of fifty four 0.02" (500 μm) diameter distribution fibers 1236 leading from the distribution device 1234. The harness 400 has sixteen linear groups 401 and 402 of output ends, corresponding to the sixteen light valve cells of the imaging module. The harness 400 also has fifty-four bundles 403 and 404 of input ends, corresponding to the fifty-four distribution fibers 1236. Each of the fifty four pixel fibers 410 in each linear group 401 and 402 receives light from one of the fifty-four input bundles 403 and 404. For example, if the first input bundle 403 is illuminated with red light, the first pixel fiber 410 of each of the linear groups 401 and 402 is illuminated with red light. If the second input bundle 404 is illuminated with red light, then the second pixel fiber 410 in the linear groups 401 and 402 is illuminated with red light, and so on.

Figure 5:
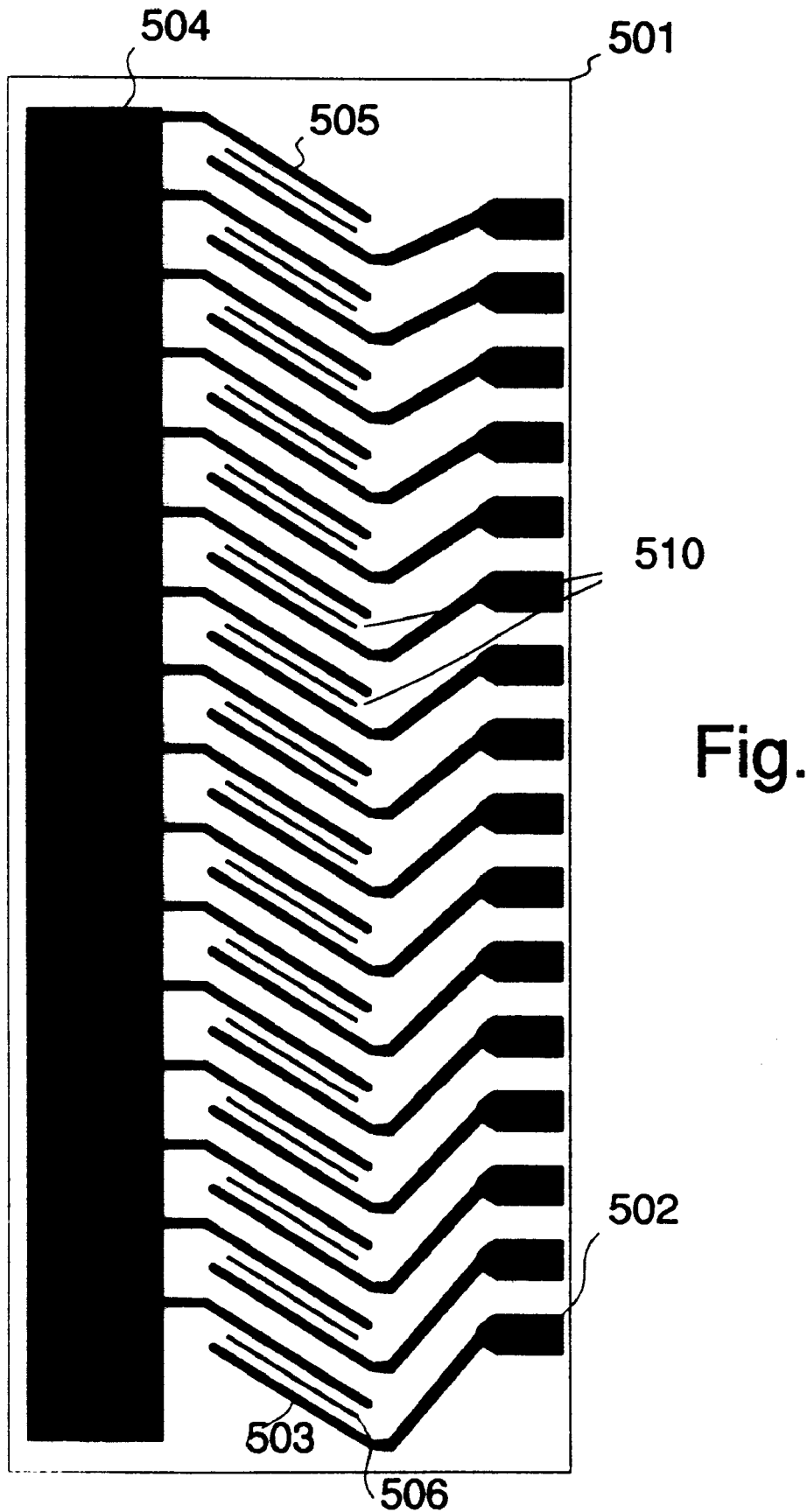
FIG. 5 shows the orientation and electroding of the light valves relative to the first ends of the optical fibers shown in FIG. 4.

The light valve chip 501 and associated pixel fiber output ends 414 are illustrated in FIG. 5. The light valve chip 501 may be made of PLZT material, as is commonly used in solid state light valves, or may be another type of polarization modulator, including other Kerr-type modulators. The light valve chip 501 includes a number of separate light valve cells 510, in this case sixteen. Light is transmitted through each light valve cell 510 from an associated pixel fiber 410. The light valve cell 510 rotates the polarization of the light in response to an electric field, and is typically sandwiched between two crossed polarizers, as is described in U.S. Pat. No. 5,054,893. Rotation of the polarization of light passing through the light valve cell 510 results in light being transmitted through the pair of crossed polarizers.

Each light valve cell 510 is positioned between electrode pairs, between which an applied electric potential controls the polarization rotating properties of the cell 510. In one particular embodiment, each cell 510 is formed between a common electrode 504 and an individual electrode. The common electrode 504 is connected to each of 16 comb-like fingers 505. Individual electrodes, such as electrode 503, are connected to respective connection tabs 502. The light valve chip 501 may be placed inside a cutout on a printed circuit board; conductive epoxy junctions may be made between traces on the printed circuit board and the connection tabs 502 and the common electrode 504. In this way, each light valve cell 510 may be addressed individually and separately from the other cells 510 on the chip 501.

The region between any common finger electrode 505, and any individual electrode 503 generates an electric field responsive to the voltage applied between the two electrodes. Except in the cases of the end electrodes, two regions of electric field are generated, one above and one below the individual electrode 503. Only one of these regions is used as a light valve cell 510 to gate light. In the region above the individual electrode 503 and below the common finger electrode 505, all of the pixel fibers 410 are configured in a linear array.

The light admitted through the various light valve cells 510 is projected by a lens system onto the photographic paper passing over a turning capstan. In one embodiment, each light valve array 501, having sixteen cells 510, has an active length of 1.4", so it is magnified by 1.205 times to produce an image length of 1.6875". Eighteen imaging modules are positioned every 1.68" to produce a total imaging length of 30". It should be appreciated that the amount of magnification by the lens system is dependent on several factors including, but not limited to, the desired resolution, the size of the light valve chip in the imaging module and the printing speed.

Figure 6:
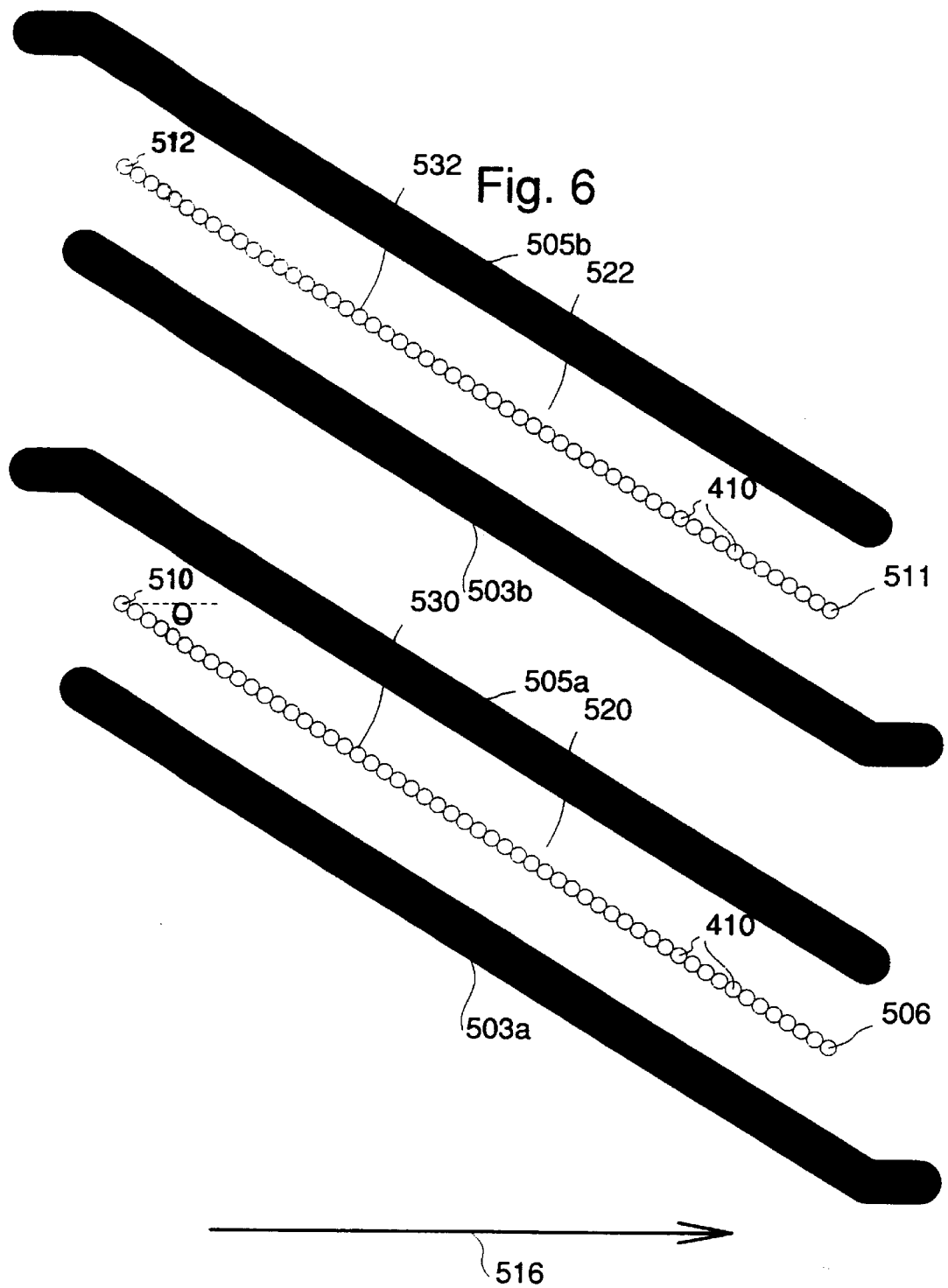
FIG. 6 shows an enlarged portion of FIG. 5.

A portion of FIG. 5 is enlarged in FIG. 6 to better show the linear arrays of output ends 414 of the pixel fibers 410. A light valve cell 520 is formed between individual electrode 503*a* and common finger electrode 505*a*. Another light valve cell 522 is formed between another individual electrode 503*b* and common finger electrode 505*b*. Pixel fibers 506–510 form one linear fiber array 530 in the first light valve cell 520 and pixel fibers 511–512 form another linear array 532 in the second light valve cell 522. There are fifty four pixel fibers 410 in each array 530 and 532.

The direction of paper motion relative to the light valve cells 520 and 522 is illustrated by the arrow 516. The fiber arrays 530 and 532 form an angle, θ, relative to the direction of paper motion. The angle, θ, and the number of pixel fibers in each array 530 and 532, are selected so that, in the direction perpendicular to the direction of paper motion, the last fiber 510 in the first array 530, matches or slightly overlaps the position of the first fiber 511, in the second array 532. If there is overlap between the end pixel fibers of adjacent arrays, the brightness of overlapping fibers may be adjusted to compensate.

The voltage to each light valve cell 520 and 522 is programmed to correspond to the particular pixel fiber 410 or fibers illuminated at any instant in time. If more than one pixel fiber 410, presumably adjacent, is illuminated at any instant in time, the data may correspond to the brightest pixel fiber or the average position of the illuminated pixel fibers.

Mounting the fibers, so that light is optimally coupled from one fiber to another, presents some practical difficulties. For example, distribution fibers have to be held in place about the distribution device in a manner so that light is optimally coupled from the distribution device to the distribution fibers as the distribution device rotates. Furthermore, the light has to be coupled optimally from each distribution fiber to a group of pixel fibers. Also, the pixel fibers have to be linearly arrayed to illuminate the light valves. One of the sources of practical difficulty arises because the small pixel fibers easily pick up a static electric charge, and so they repel each other unless an adhesive is used. However, adhesives introduce additional difficulties, because the fibers are polished after being positioned, and the adhesive interferes with the polishing process. Therefore, it is preferable to hold the fibers in position without the use of adhesives. It is also preferable to use a method of mounting the pixel fibers using a method that is automatable.

Figure 11:
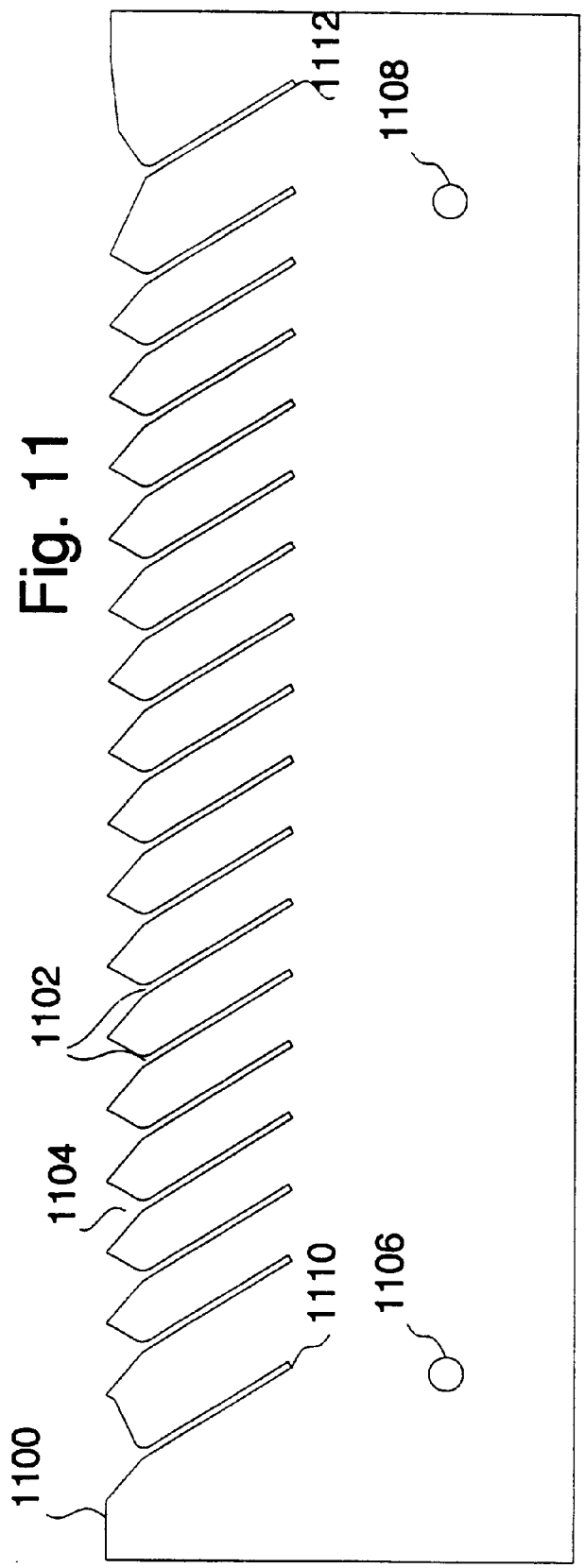
FIG. 11 shows a mount for output ends of pixel fibers according to an embodiment of the present invention.

Recall from FIG. 6 that the pixel fibers 410 are positioned in a linear array angled relative to the direction of paper travel so that the position of the last fiber in one array across the paper abuts or slightly overlaps the first fiber of the next array. One approach of mounting the pixel fibers in linear arrays relative to the light valves is illustrated in FIG. 11, which shows a pixel fiber output mount 1100 having a number of central slits 1102. The number of central slits is equal to the number of light valve cells 510. Continuing with the example discussed earlier, since there are sixteen light valve cells 510, there are sixteen respective central slits 1102. Above each of the slits 1102 is a funnel-shaped region 1104 to receive the fiber before it is passed into the slit 1102. Alignment holes 1106 and 1108 may be provided for aligning the mount 1100 with the light valve chip 501. Nonfunctioning slits 1110 and 1112, used in fabrication as explained below, may be provided at either end of the arrangement of slits 1102.

The mount 1100 may be formed from any suitable material that is machinable with the precision necessary to accommodate the pixel fibers, for example metals including aluminum and stainless steel. In one particular embodiment, the mount 1100 is 0.006" (150 μm) thick and each of the slits 1102 has a width of approximately 0.0035" (88 μm) to receive pixel fibers having a nominal diameter of 0.003" (75 μm). The precision with which the slits 1102 can be formed using laser cutting is typically less than ±0.0004" (10 μm). A nominal slit width of 0.0035" (88 μm) ensures that the slits 1102 are at every point sufficiently wide that the pixel fibers can be easily dropped, without interference, into position in the slits.

Figure 12:
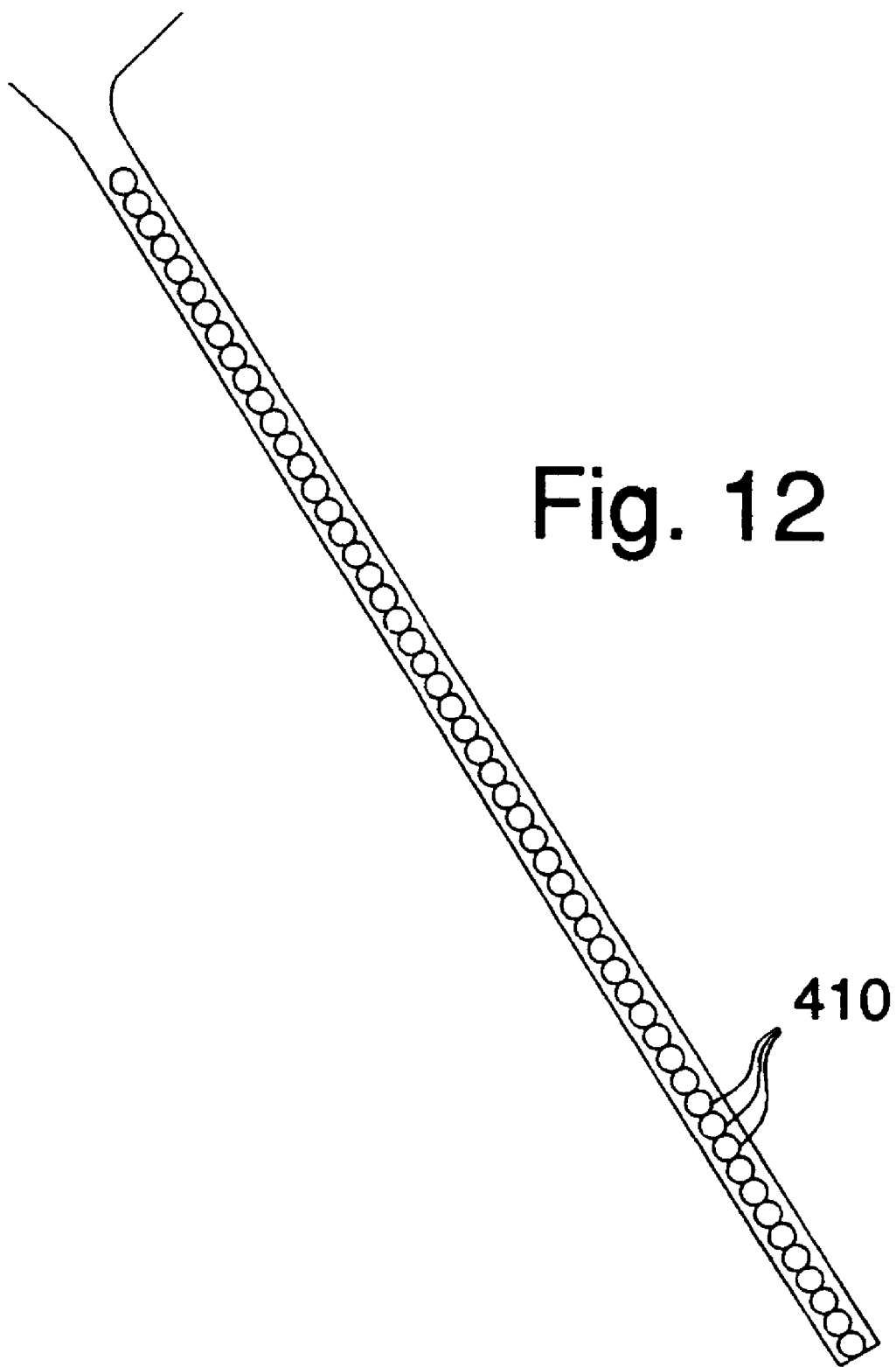
FIG. 12 shows expanded detail of the mount illustrated in FIG. 11.

An expanded view of one slit 1102 is illustrated in FIG. 12, with fifty four pixel fibers 1202 in place. While the fibers 410 are shown to be lying in a perfectly straight line, it should be understood that some misalignment of the fibers 410 within the slit 1102 is likely to occur. As long as such misalignment, for example, the fibers 410 not being in a perfectly straight line, is slight then the effect of the misalignment may be compensated for by lookup tables which adjust the intensity of the light from each fiber 410 for exposing the photosensitive paper. The fiber strength memory 1403 provides such compensation, and is created in response to the actual separation between each fiber. There is typically some degree of overlap between pixels, and the amount of fiber misalignment is small, so the effect of misalignment of fibers is not detected in the final, exposed image.

Figure 13:
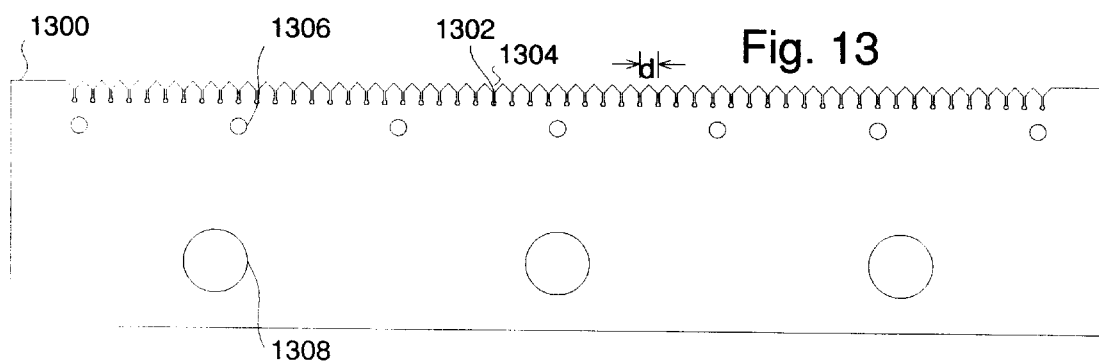
FIG. 13 shows a mount for input ends of pixel fibers according to an embodiment of the present invention.

The input ends 412 ends of the pixel fibers 410 are formed in groups 403 that couple to the distribution fibers. The input ends 412 are positioned in a group by a guide, for example as shown in FIG. 13. Like the pixel fiber output mount 1100 used at the output ends 414, the pixel fiber input mount 1300 may be formed from metal, for example brass or stainless steel, with the guiding portions formed by a suitable process, such as laser cutting or photoetching. The input mount 1300 has round guide holes 1302 into which the input ends 412 of the pixel fibers 410 are inserted via funnels 1304. Each mount 1300 also has a number of alignment holes 1306 and mounting holes 1308.

Figure 14:
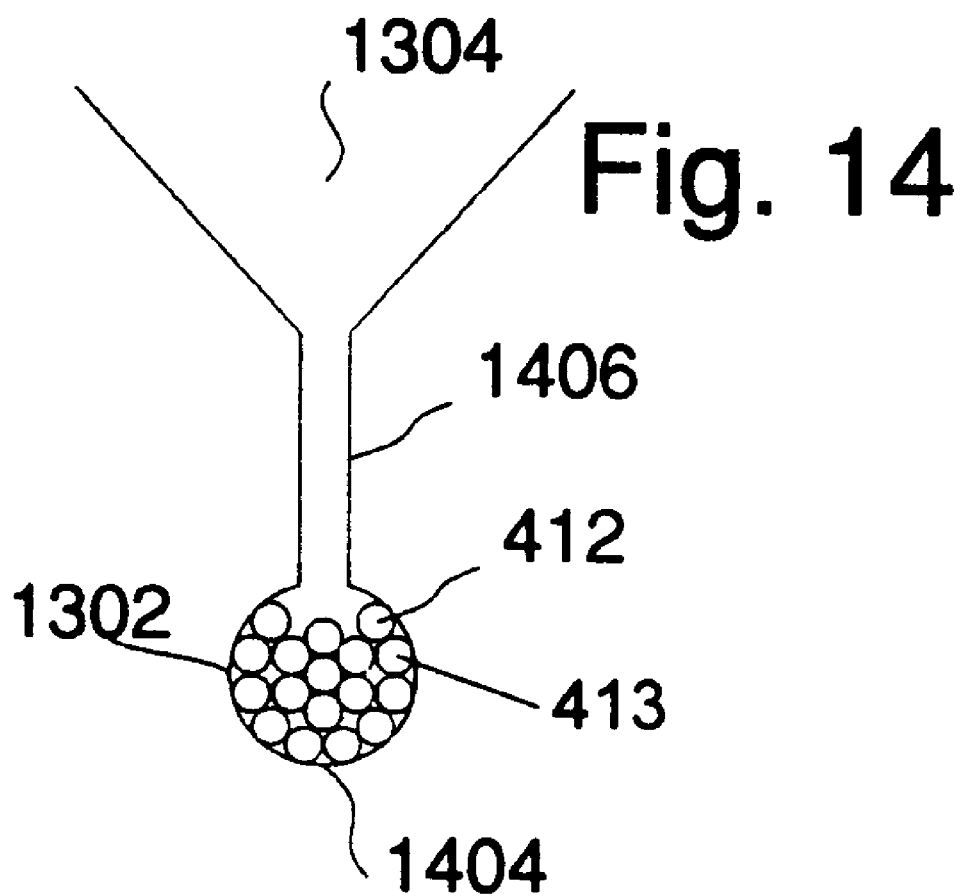
FIG. 14 shows expanded detail of the mount illustrated in FIG. 12.

An enlargement of one of the guide holes 1302 is illustrated in FIG. 14. The guide hole 1302 has a rounded well 1404 connected to the funnel 1304 via a slitted portion 1406. The rounded well 1404 contains the input ends 412 of the pixel fibers 410 grouped together in a manner that permits efficient optical coupling into the pixel fibers 410 from the respective distribution fiber. In the running example where there are sixteen light valve cells 510 fed by each distribution fiber, the rounded well 1404 contains input ends 412, plus an additional end 413 that results from the winding process discussed below. Where the pixel fibers 410 have a diameter of 0.003" (75 μm), the slitted portion typically has a width of no less than approximately 0.0035" (88 μm), and the rounded well 1404 has a diameter of approximately 0.015" (375 μm) to match to the distribution fiber that has a diameter of approximately 0.02" (500 μm). The wells 1404 may each be separated from its neighbors by a uniform separation distance, d.

The entire pixel fiber assembly includes the fiber harness 400, with pixel fiber input mounts 1300 grouping together several pixel fiber input ends 412, and pixel fiber output mounts 1100 to hold the pixel fiber output ends 414 in linear arrays at the light valve cells 510. The fiber harness 400 is assembled in an automatic winding machine. The pixel fiber input and output mounts 1100 and 1300 are placed around a rotor which turns slowly. A sufficient number of pixel fiber input and output mounts 1100 and 1300 may be placed to make two or more assemblies. A moving capillary tube positioned close to the rotor drops fiber optic strands from a continuous fiber roll into the various funnels of the pixel fiber input and output mounts 1100 and 1300. The sequence of funnels in which the fiber is deposited may be programmed to make the final assembly appear as illustrated in FIG. 4.

Figure 15:
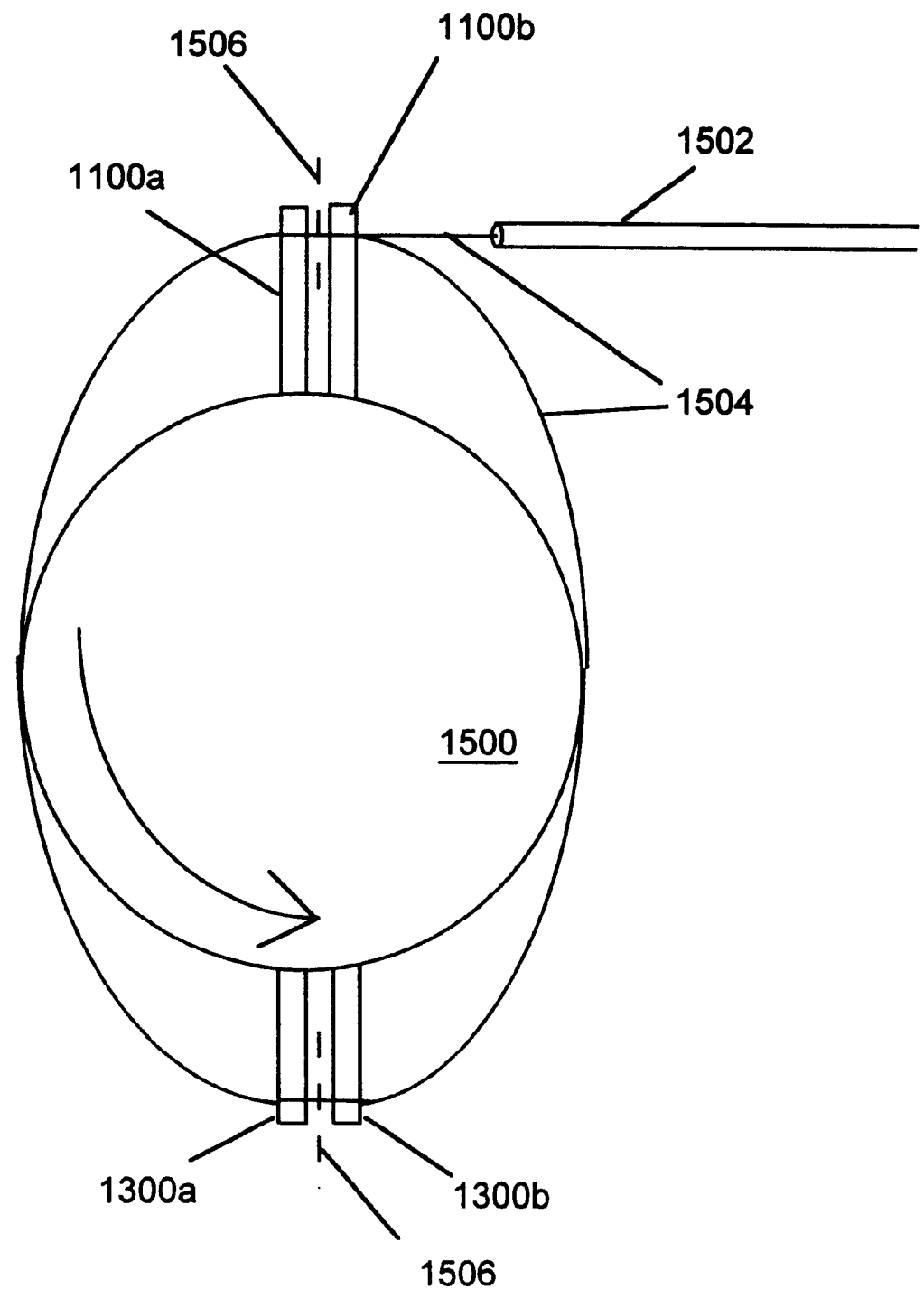
FIG. 15 illustrates a method for winding a pixel fiber harness according to an embodiment of the present invention.

The pixel fiber assemblies may be fabricated in normal and mirror image pairs, using the winding sequence provided below. All of the slits (pixel fiber output mounts) are wound for one particular well (pixel fiber input mounts), and then the slits are wound for the next well etc. It is most efficient to place the rounded wells of the normal and mirror image pixel fiber input mounts 1300 and the slits of the normal and mirror image pixel fiber output mounts 1100 close together, as shown in FIG. 15. The normal pixel fiber input and output mounts 1100a and 1300a are positioned on the rotor 1500 close to the mirror image pixel fiber input and output mounts 1100b and 1300b respectively. The capillary tube 1502 drops the continuous fiber 1504 into the funnel portions 1104 or 1304 of the appropriate slits or wells of the mounts 1100a, 1100b, 1300a and 1300b as the rotor 1500 rotates. It is advantageous that the same wells be used on normal and mirror image parts, and the same slits used on normal and mirror image slitted guides. Therefore, for one revolution one of the otherwise nonfunctional end slits, either 1110 or 1112 may be used.

TABLE II

Winding Sequence

| normal harness | | mirror image harness | |
|---|---|---|---|
| Input end round wells | Output end slitted guides | Output end slitted guides | Input end round wells |
| Well #1 | Slit #1 | Slit #1 | Well #1 |
| Well #1 | Slit #2 | Slit #2 | Well #1 |
| ... | | | |
| Well #1 | Slit #16 | Slit #16 | Well #1 |
| Well #1 | unused slit #602 | unused slit #602 | Well #2 |
| Well #2 | Slit #1 | Slit #1 | Well #2 |
| Well #2 | Slit #2 | Slit #2 | Well #2 |
| ... | | | |
| Well #54 | Slit #1 | Slit #1 | Well #54 |
| Well #54 | Slit #2 | Slit #2 | Well #54 |
| Well #54 | Slit #16 | Slit #16 | Well #54 |

Because the capillary 1502 deposits the fiber 1504 into a relatively wide funnel portion 1104 or 1304, the translational accuracy required of the capillary 1502 is small. If dust or debris interferes at some point in the positioning of the fiber 1504 within a mount 1100a, 1100b 1300a or 1300b, subsequent mechanical pressure on the fiber 1504 is normally sufficient to displace the debris and allow the fiber 1504 to reach its desired position within the slit or well. It should be appreciated that another approach may be used in which only normal assemblies are wound on the rotor, although this may result in greater lengths of fiber in the unused sections between guides, with increased fiber waste.

After the fiber 1504 has been wound on the mounts 1100a, 1100b, 1300a and 1300b, epoxy is wicked into the winding and cured. After curing, the fiber 1504 is cut between the mounts 1100a and 1100b, and between the mounts 1300a and 1300b, at the points shown by dashed lines 1506, to form the pixel fibers 410. The ends of the fibers 410 are then mounted in, and epoxied into, pieces to hold the ends stable. Then the input and output ends 412 and 414 are polished flush with their respective mounts 1100 and 1300.

Figure 16:
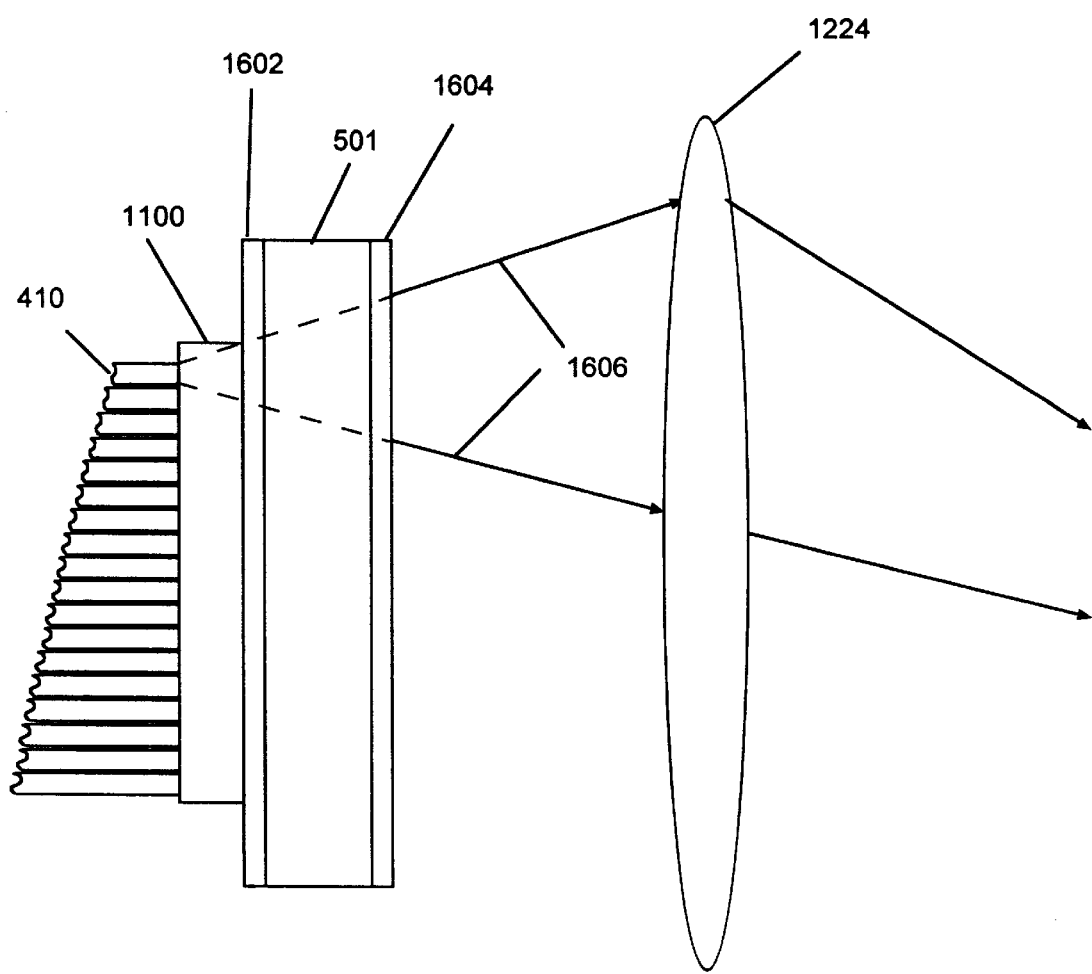
FIG. 16 illustrates the pixel fibers mounted relative to a light valve array.

After polishing, a polarizer is placed over the output ends 414 mounted in the pixel fiber output end mount 1100 and the light valve chip 501 placed over the polarizer, aligned to the fiber optics, as illustrated in FIG. 16. The pixel fibers 410 terminate with their output ends 414 in the pixel fiber output end mount 1100. The light from each of the fibers 410 passes through a first polarizer 1602, the light valve 501 and a second polarizer 1604 whose pass polarization direction is crossed relative to the pass polarization direction of the first polarizer 1602. After passing through the second polarizer 1604, the light from the pixel fibers 410 is focused on to the photosensitive medium 1310 by the lens system 1224. For clarity, the figure shows light 1606 from the uppermost fiber 410 only.

An array of distribution fibers is aligned to the input ends 412 mounted in the wells 1302 of the pixel fiber input mount 1300, so that each of the pixel fiber input ends 412 receives light from a distribution fiber. The distribution fibers may be aligned using a guide as illustrated in FIG. 17. In this guide 1700 there are slots 1702 for distribution fibers 1704 below funnel areas 1706. The slots 1702 are separated from each other by an amount equal to the spacing between corresponding wells 1404 in the mating pixel fiber input mount 1300. For example,. where the wells 1404 are separated by a distance d, then the slots 1702 are also separated by an amount d. The guide 1700 includes alignment holes 1708 which match the alignment holes 1306 in the mating pixel fiber input mount 1300. Furthermore, the guide 1700 has mounting holes 1710 which match mounting holes 1308 in the mating pixel fiber input mount 1300. Pins may be inserted in at least some of the pairs of corresponding alignment holes 1306 and 1708 when the guide 1700 is mated to the pixel fiber input mount 1300. After that, the guide 1700 and the pixel fiber input mount 1300 may be firmly attached together using bolts inserted through the mounting holes using holes 1308 and 1710. Where the diameter of the well 1404 is less than the diameter of the distribution fiber 1704, there may be misalignment between the mount 1300 and the guide 1700 by an amount equal to the difference in diameters. For example, where the distribution fibers have a diameter of 0.020" (500 $\mu$m) and the wells 1404 have a diameter of 0.015" (375 $\mu$m), up to 0.005" (125 $\mu$m) of misalignment can occur between the mount 1300 and the guide 1700 without loss of light through the pixel fibers 410.

Various modifications, within the scope of the invention, may be made to the examples discussed above within the scope of the present invention. For example, there are eight imaging modules, and only one fiber group surrounds about ¼ of the puck. Therefore, only one color illuminates the fiber group at any one time. An advantage of this embodiment is that the electronic complexity, required to provide for simultaneous imaging of different colors, may be reduced. On the other hand, since the green and blue light is not used at the same time as the red light, a substantial fraction of the light is discarded in this case. This embodiment illustrates the compromises that may be made between the system complexity and light use efficiency This approach may be advantageous in applications such as imaging high sensitivity film, where the amount of light is not as important, and/or the image width need not be so wide.

Different numbers of pixel fibers per light valve cell, and/or a different number of light valve cells per imaging module, may be used, resulting in the need for fiber harnesses having different numbers of fibers. For example, there may be fifty pixel fibers per light valve cell, with thirty two light valve cells per light valve chip. In this case, a single module, with 1,600 pixels (50×32), may be used to expose a roll of photographic paper 4" (10 cm) wide at a resolution of 400 pixels/inch (157 pixels/cm). The rate of scanning in the light distribution device primary scanner may be increased to 200 scan cycles (red, green, blue, red, of all 50 fibers each) per second. With a vertical resolution also of 400 pixels/inch (157 pixels/cm), the vertical imaging rate may be 0.50"/second (1.25 cm/s). Here, since the total number of pixel fibers is small, and the total width of paper to be covered is also small, it may be advantageous to avoid the use of distribution fibers, and to couple the pixel fibers directly to the distribution device.

There are many other aspects of the digital color printer that may be different from the examples discussed above, without departing from the scope of the invention. For example, the number of imaging modules used across the width of the photosensitive paper may be selected depending on what particular resolution and speed are desired. Several design aspects of the printer are dependent on the width and nature of the photosensitive medium used, such as the amount of light required to expose the medium. This may affect the printing speed.

As noted above, the present invention is applicable to digital color printers and is believed to be particularly applicable to high speed, high resolution printers. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A mount for holding optical fibers relative to a photosensitive surface, comprising:
   a sheet-like body having a receptor edge, and defining a plurality of slots therethrough to receive the optical fibers, the plurality of slots extending from the edge into the body and having a funnel-shaped opening extending from the edge of the body, the slots being substantially parallel to each other and angled relative to the edge of the body, and configured to receive and retain optical fibers substantially perpendicular to a general plane of the body, wherein the slots have widths selected so that, when placed within the slots, the optical fibers form essentially linear arrays.

2. A mount as described in claim 1, wherein an angle of the slots relative to the edge of the body and a length of the slots are selected so that a fiber in a last position in one slot slightly overlaps a fiber in a first position of an adjacent slot, looking in a direction of travel of the photosensitive surface.

3. A mount as described in claim 1, further comprising a plurality of optical fibers positioned within the slots to form a linear array of fibers in each slot, an output end of each fiber being approximately flush with an output surface of the body.

4. A mount as described in claim 3, further comprising a polarizer disposed to receive light from the output ends of the fibers positioned within the slots of the body, and a light valve array having an array of light valve cells disposed to receive the light from the polarizer, each light valve cell positioned to receive light from fibers in a respective linear array of fibers formed from a slot.

5. A mount as described in claim 3, further comprising an input end mount at input ends of the fiber, the input end mount including an element having a plurality of wells therethrough, each well connecting to an edge of the element by a respective channel section, the channel section having a funnel-shaped section at the element edge, the input ends of the fibers being located in respective wells of the input end mount.

6. A mount as described in claim 5, wherein the wells are essentially circular in shape, and the input ends of the fibers located in each well are restricted by the well to form an essentially circular grouping.

7. A mount as described in claim 5, wherein the body has N slots, each well contains input ends of N fibers, each of the N fibers being coupled to a respective one of the N slots on the body, and the element includes M wells, and each slot on the body contains output ends of M fibers, each of the M fibers being coupled to a respective one of the M wells on the element.

8. A mount as described in claim 1, further comprising an extra slot at either end of a grouping of the plurality of slots for use in winding fibers onto the mount.

9. A mount for grouping optical fibers to receive light from a light source, comprising:
   a sheet-like element defining a plurality of wells therethrough, each well connecting to an edge of the element by a respective channel section, each channel section having a funnel-shaped section at the element edge, each well configured to received and retain optical fibers substantially perpendicular to a general plane of the element, and each well having a shape selected so that input ends of fibers grouped in the well optimally couple light from the light source.

10. A mount as described in claim 9, wherein the wells are regularly spaced apart from each other by a well spacing distance.

11. A mount as described in claim 10, further comprising optical fibers having input ends grouped in the wells of the element and a light source including an array of distribution fibers separated from each other by the well separation distance, each distribution fiber coupling light to the input ends of the optical fibers grouped in a respective well.

12. A mount as described in claim 10, further comprising optical fibers having input ends grouped in respective wells of the element, output ends of the optical fibers being arranged in linear arrays in an output end mount, the output end mount having a body with plurality of linear slots therethrough to receive the optical fibers and to position the fibers into linear arrays.

13. A mount as described in claim 12, wherein the element has M wells and N optical fibers grouped within each well, an optical fiber in each well being coupled to a respective one of N linear slots on the output end mount, so that output ends of M fibers, each from a respective one of the M wells, are positioned in each of the linear slots.

14. A mount as described in claim 12, wherein each slot in the body is provided with a funnel-shaped opening on an edge of the body, the slots are substantially parallel to each other and angled relative to the edge of the body.

15. A mount as described in claim 14, wherein an angle of the slots relative to the edge of the body and a length of the slots are selected so that, looking in a direction of travel of a photosensitive surface relative to the body, an output end of a fiber in a last position in one slot slightly overlaps an optical fiber in a first position of an adjacent slot.

16. A mount as described in claim 9, wherein the wells are essentially circular in cross-section so that the grouping of input ends in each well optimally couples light from a circular light source.

17. A method of forming a pixel fiber optic harness, comprising:
   arranging at least one pair of fiber mounts on a rotor, the pair of fiber mounts including a pixel fiber input end mount and a pixel fiber output end mount;
   rotating the rotor while feeding an optical fiber into selected openings on the pixel fiber input and output end mounts;
   affixing the optical fiber to the pixel fiber input and output end mounts;
   cutting the optical fiber between selected adjacent pixel fiber input and output end mounts to form a plurality of pixel fibers with input and output ends;
   polishing the input and output ends of the pixel fibers flush with their respective pixel fiber input and output end mounts.

18. A method as described in claim 17, wherein the pixel fiber input end mounts each include a plurality of wells and the pixel fiber output end mount includes a plurality of linear slots, and feeding an optical fiber into selected openings on the pixel fiber input and output end mounts includes selecting openings on the pixel fiber input and output end mounts so that, for each particular well on the pixel fiber input end mount, the fiber passes between the particular well and each of the linear slots on the respective pixel fiber output end mount.

19. A method as described in claim 17, wherein arranging the at least one pair of fiber mounts on a rotor includes arranging an even number of pairs of fiber mounts on the rotor, with pixel fiber input end mounts of two pairs of fiber mounts adjacent one another, and pixel fiber output end mounts of other pairs of two pairs of fiber mounts adjacent one another, for forming at pairs of normal-image and mirror-image harnesses.

20. A method as described in claim 17, wherein the pixel fiber input end mounts each include an element having a plurality of wells therethrough, each well connecting to an edge of the element by a respective channel section, each channel section having a funnel-shaped section at the element edge to receive the optical fiber, each well having a shape selected so that input ends of fibers grouped in the well optimally couple light from the light source.

21. A method as described in claim 17, wherein the pixel fiber output end mounts each include a body having a plurality of linear slots therethrough to receive the optical fibers, each slot being provided with a funnel-shaped opening on an edge of the body to receive the optical fiber, the slots being substantially parallel to each other and angled relative to the body, wherein the slots have widths selected so that the output ends of the pixel fibers within the slots from essentially linear arrays.

* * * * *